(12) United States Patent
Ishigaki et al.

(10) Patent No.: US 8,829,713 B2
(45) Date of Patent: Sep. 9, 2014

(54) POWER CONVERSION CIRCUIT AND POWER CONVERSION CIRCUIT SYSTEM

(75) Inventors: Masanori Ishigaki, Nagoya (JP); Shuji Tomura, Nagoya (JP); Takaji Umeno, Nisshin (JP); Kenji Kimura, Miyoshi (JP)

(73) Assignees: Kabushiki Kaisha Toyota Chuo Kenkyusho, Aichi-Gun (JP); Toyota Jidosha Kabushiki Kaisha, Toyota (JP)

( * ) Notice: Subject to any disclaimer, the term of this patent is extended or adjusted under 35 U.S.C. 154(b) by 875 days.

(21) Appl. No.: 13/027,726

(22) Filed: Feb. 15, 2011

(65) Prior Publication Data

US 2011/0198933 A1    Aug. 18, 2011

(30) Foreign Application Priority Data

Feb. 17, 2010 (JP) ................................. 2010-031996
Dec. 10, 2010 (JP) ................................. 2010-275507

(51) Int. Cl.
*H02J 9/00* (2006.01)
*H02M 3/335* (2006.01)
*B60R 25/00* (2013.01)
*H02J 9/04* (2006.01)

(52) U.S. Cl.
CPC ............ *H02M 3/33592* (2013.01); *H02J 9/04* (2013.01); *B60R 25/00* (2013.01)
USPC .......... 307/66; 363/21.12; 363/21.01; 363/69; 363/71

(58) Field of Classification Search
CPC .................................. H02J 9/04; H02M 7/68
USPC .......................................................... 307/66
See application file for complete search history.

(56) References Cited

U.S. PATENT DOCUMENTS

| 6,574,125 | B2 * | 6/2003 | Matsukawa et al. ............ 363/71 |
| 7,408,794 | B2 | 8/2008 | Su |
| 7,830,686 | B2 * | 11/2010 | Zeng et al. ...................... 363/69 |
| 2006/0139823 | A1 | 6/2006 | Shoji et al. |

FOREIGN PATENT DOCUMENTS

JP    A-2006-187147    7/2006

\* cited by examiner

*Primary Examiner* — Rexford Barnie
*Assistant Examiner* — Toan Vu
(74) *Attorney, Agent, or Firm* — Oliff PLC

(57) ABSTRACT

A power conversion circuit system comprises a primary conversion circuit, a secondary conversion circuit, and a control circuit for controlling the primary and secondary conversion circuits. The primary conversion circuit comprises a primary full bridge circuit, which includes a bridge section composed of both a primary coil in a transformer and a primary magnetic coupling reactor in which two reactors are magnetically coupled, a first input/output port disposed between a positive bus bar and a negative bus bar of the primary full bridge circuit, and a second input/output port disposed between the negative bus bar of the primary full bridge circuit and a center tap of the primary coil in the transformer. The secondary conversion circuit has a configuration similar to that of the primary conversion circuit.

19 Claims, 22 Drawing Sheets

F I G . 2
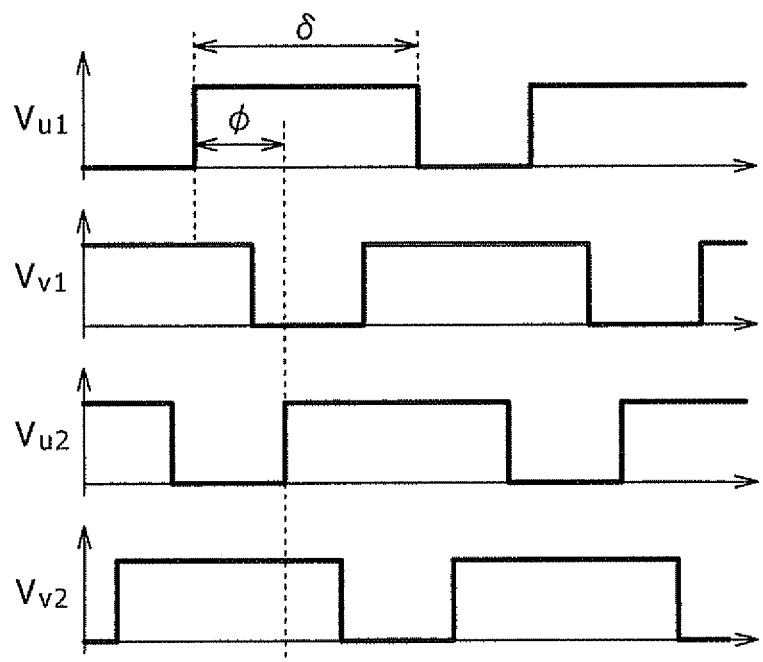

POWER CONVERSION CIRCUIT AND POWER CONVERSION CIRCUIT SYSTEM

PRIORITY INFORMATION

This application claims priority to Japanese Patent Application Nos. 2010-031996 filed on Feb. 17, 2010 and 2010-275507 filed on Dec. 10, 2010, which are incorporated herein by reference in their entirety.

BACKGROUND OF THE INVENTION

1. Field of the Invention

This invention relates to a power conversion circuit and a power conversion circuit system, and, more particularly, to a power conversion circuit having a plurality of input/output ports, and a power conversion circuit system including the power conversion circuit.

2. Description of the Related Art

It may be desired that, in a power conversion circuit having a plurality of input/output ports, electric power is converted between two input/output ports among the plurality of input/output ports. For example, Patent Document 1 (U.S. Pat. No. 7,408,794) discloses a DC-DC converter circuit which includes three input/output ports and a half bridge circuit. It is further disclosed that a high voltage inverter circuit, a 14V load, and a 42V load are connected to the three input/output ports of the DC-DC converter circuit.

Meanwhile, Patent Document 2 (JP A 2006-187147) discloses a DC-DC converter circuit which includes two input/output ports and a full bridge circuit. In addition to reactors constituting a transformer, three other reactors are provided in the DC-DC converter circuit. It is also disclosed that a high voltage inverter circuit and a low voltage electronic device are connected to the two input/output ports of the DC-DC converter circuit.

Although the above Patent Document 1 discloses that electric power is converted using the three input/output ports, the DC-DC converter circuit is low in electric capacitance, and limited in its range of adaptable application due to a configuration of using the half bridge circuit. Therefore, Patent Document 1 does not disclose power conversion between two input/output ports selected from among three or more input/output ports. That is, Patent Document 1 provides no disclosure of a specific way of converting electric power between two input/output ports selected from four input/output ports.

Meanwhile, the above Patent Document 2 discloses power conversion using the two input/output ports, and the DC-DC converter circuit of Patent Document 2 is high in electric capacitance and broader in its range of adaptable application, because the DC-DC converter circuit is composed of the full bridge circuit as distinct from the circuit of Patent Document 1. However, the three additional reactors are needed, which might impair a cost merit. In addition, Patent Document 2 includes neither description about two or more input/output ports, nor disclosure of the specific way of converting electric power between two input/output ports selected from four input/output ports.

SUMMARY OF THE INVENTION

A power conversion circuit according to the present invention comprises a total of four input/output ports consisting of two input/output ports associated with a primary conversion circuit and two input/output ports associated with a secondary conversion circuit which is magnetically coupled to the primary conversion circuit, in which electric power is converted between any two of the four input/output ports.

Further, in the power conversion circuit according to the present invention, the primary conversion circuit preferably comprises a primary full bridge circuit including a bridge section which has both a primary coil in a center tap transformer for magnetically coupling the primary conversion circuit to a secondary conversion circuit, and a primary magnetic coupling reactor composed of two magnetically coupled reactors which are connected to the respective ends of the primary coil in the transformer, and further comprises a first input/output port disposed between a positive bus bar (bus line) and a negative bus bar (bus line) of the primary full bridge circuit, and a second input/output port disposed between the negative bus bar of the primary full bridge circuit and a center tap of the primary coil in the transformer. It is also preferable that the secondary conversion circuit comprises a secondary full bridge circuit including a bridge section which has both a secondary coil in a center tap transformer, and a secondary magnetic coupling reactor composed of two magnetically coupled reactors which are connected to the respective ends of the secondary coil in the transformer, and further comprises a third input/output port disposed between a positive bus bar and a negative bus bar of the secondary full bridge circuit, and a fourth input/output port disposed between the negative bus bar of the secondary full bridge circuit and a center tap of the secondary coil in the transformer.

Still further, a power conversion circuit system according to the present invention comprises the above-described power conversion circuit, a load connected to any one of the input/output ports, a first energy storage element connected to any one of the input/output ports, and a second energy storage element which is connected to another one of the input/output ports different from the one to which the first energy storage element is connected, and has a characteristic different from that of the first energy storage element.

Furthermore, in the power conversion circuit system according to the present invention, the load is preferably connected to the input/output port which is directly supplied with stepped up power obtained by stepping up a voltage of output power of the first energy storage element in one of the primary conversion circuit and the secondary conversion circuit, whichever is connected to the first energy storage element. Then, the second energy storage element is preferably connected to the input/output port associated with the other one of the primary conversion circuit and the secondary conversion circuit different from the one connected to the first energy storage element. It is further preferable for the power conversion circuit system to include a control unit comprising a transmission controlling section which performs control operation for transmitting electric power from the second energy storage element via the primary and secondary conversion circuits to the load, a phase difference adjusting section which adjusts a phase difference between the primary conversion circuit and the secondary conversion circuit in light of feedback on transmission power from the second energy storage element to the load to ensure that the transmission power from the second energy storage element to the load is maintained equal to predetermined electric power, a step-up controlling section which performs control operation for stepping up the output power of the first energy storage element in such a manner that the stepped-up power supplied from the first energy storage element to the load is equal to differential power between required power of the load and the transmission power from the second energy storage element to the load, and a step-up duty ratio adjusting section which adjusts a step-up duty ratio used for stepping up the output power of the first energy storage element, in light of feedback on a voltage across the load to ensure that the voltage across the load is maintained at a predetermined voltage.

Moreover, in the power conversion circuit system according to the present invention, the load is preferably connected to the input/output port which is directly supplied with stepped-up power obtained by stepping up a voltage of output power of the first energy storage element in one of the primary conversion circuit and the secondary conversion circuit, whichever is connected to the first energy storage element. In addition, the second energy storage element is preferably connected to the input/output port associated with the other one of the primary conversion circuit and the secondary conversion circuit different from the one connected to the first energy storage element. It is preferable for the power conversion circuit system to include a control unit comprising a step-up controlling section which performs control operation for stepping up the output power of the first energy storage element, a step-up duty ratio adjusting section which adjusts a step-up duty ratio used for stepping up the output power of the first energy storage element in light of feedback on a voltage across the load to ensure that the voltage across the load is maintained at a predetermined voltage, a transmission controlling section which performs control operation for transmitting electric power from the second energy storage element via the primary and secondary conversion circuits to the first energy storage element, and a phase difference adjusting section which adjusts a phase difference between the primary conversion circuit and the secondary conversion circuit in light of feedback on a voltage across the first energy storage element to ensure that the voltage across the first energy storage element is maintained at a predetermined value.

Further, in the power conversion circuit system according to the present invention, the load is preferably connected to the input/output port which is directly supplied with stepped-up power obtained by stepping up a voltage of output power of the first energy storage element in one of the primary conversion circuit and the secondary conversion circuit, whichever is connected to the first energy storage element. In addition, the second energy storage element is preferably connected to the input/output port associated with the other one of the primary conversion circuit and the secondary conversion circuit different from the one connected to the first energy storage element. It is also preferable for the power conversion circuit system to include a control unit comprising a step-up controlling section which performs control operation for stepping up the output power of the first energy storage element, a step-up duty ratio adjusting section which adjusts a step-up duty ratio used for stepping up the output power of the first energy storage element, in light of feedback on a voltage across the load to ensure that the voltage across the load is maintained at a predetermined voltage, and in light of feedback on electric power of the first energy storage element to ensure that the electric power of the first energy storage element is maintained equal to predetermined power, a transmission controlling section which performs control operation for transmitting electric power from the second energy storage element to the load in such a manner that the transmission power transmitted from the second energy storage element via the primary and secondary conversion circuits to the load is equal to differential power between required power of the load and the stepped-up power supplied from the first energy storage element to the load, and a phase difference adjusting section which adjusts a phase difference between the primary conversion circuit and the secondary conversion circuit in light of feedback on transmission power from the second energy storage element to the load to ensure that the transmission power from the second energy storage element to the load is maintained equal to the differential power.

Still further, in the power conversion circuit system according to the present invention, a first load is preferably disposed in parallel to the input/output port which is the same as the input/output port to which the first energy storage element is connected, the second energy storage element is preferably connected to the input/output port associated with one of the primary conversion circuit and the secondary conversion circuit, whichever is different from that connected to the first energy storage element, and a second load is preferably connected to the input/output port which is directly supplied with stepped-up power obtained by stepping up output power of the second energy storage element in one of the primary conversion circuit and the secondary conversion circuit, whichever is connected to the second energy storage element. It is also preferable for the power conversion circuit system, to include a control unit comprising a step-up controlling section which performs control operation for stepping up the output power of the second energy storage element, a step-up duty ratio adjusting section which adjusts a step-up duty ratio used for stepping up the output power of the second energy storage element, in light of feedback on a voltage across the second load to ensure that the voltage across the second load is maintained at a predetermined voltage, a transmission controlling section which performs control operation for transmitting electric power from the second energy storage element to the load in such a manner that transmission power transmitted from the second energy storage element via the primary and secondary conversion circuits to the first load is equal to predetermined power, and a phase difference adjusting section which adjusts a phase difference between the primary conversion circuit and the secondary conversion circuit, in light of feedback on the transmission power from the second energy storage element to the first load to ensure that the transmission power from the second energy storage element to the first load is maintained equal to the predetermined power.

Furthermore, a power conversion circuit system according to the present invention comprises the above-described power conversion circuit, and an alternating-current source connected to the midpoint of the primary magnetic coupling reactor or the secondary magnetic coupling reactor.

Moreover, a power conversion circuit system according to the present invention comprises the above-described power conversion circuit, a secondary load connected to the third input/output port, a secondary power source connected in parallel with the secondary load to the third input/output port for supplying electric power to the secondary load, a primary capacitor connected to the first input/output port, a primary power source connected to the second input/output port for supplying electric power to the primary capacitor, and a control unit for performing control operation to supply auxiliary electric power from the primary power source to the secondary load when electric power supplied from the secondary power source to the secondary load is insufficient.

Further, in the power conversion circuit system according to the present invention, the primary capacitor is preferably a high-capacitance capacitor having an output characteristic superior to those of the primary and secondary power sources, and the control unit preferably performs control operation such that a stationary power component in required power of the secondary load is supplied from the secondary power source to the secondary load, while a sudden transient power component in the required power of the secondary load is supplied from the primary capacitor to the secondary load.

Still further, a power conversion circuit system according to the present invention comprises the above-described power conversion circuit, a secondary load connected to the third input/output port, a secondary power source connected in parallel with the secondary load to the third input/output port for supplying electric power to the secondary load, a primary load connected to the first input/output port, a primary capacitor connected in parallel with the primary load to the first input/output port, a primary power source connected to the second input/output port for supplying electric power to the primary load, and a control unit which performs control operation to transmit electric power between the primary conversion circuit and the secondary conversion circuit.

Furthermore, in the power conversion circuit system according to the present invention, the control unit preferably comprises a step-up controlling section which performs control operation to step up output power of the primary power source, a step-up duty factor adjusting section which adjusts a step-up duty ratio used for stepping up the output power of the primary power source, in light of feedback on a voltage across the primary load to ensure that the voltage across the primary load is maintained at a predetermined voltage, a transmission controlling section which performs control operation to transmit electric power from the primary power source to the secondary power source in such a manner that transmission power transmitted from the primary power source via the primary and secondary conversion circuits to the secondary load is equal to predetermined electric power, and a phase difference adjusting section which adjusts a phase difference between the primary conversion circuit and the secondary conversion circuit in light of feedback on the transmission power from the primary power source to the secondary load to ensure that the transmission power from the primary power source to the secondary load is maintained equal to predetermined electric power.

Moreover, a power conversion circuit system according to the present invention comprises the above-described power conversion circuit, a secondary load connected to the third input/output port, a secondary power source connected to the third input/output port in parallel with the secondary load for supplying electric power to the secondary load, a secondary capacitor connected to the fourth input/output port, a primary capacitor connected to the first input/output port, a primary load connected to the second input/output port, a primary power source connected to the second input/output port in parallel with the primary load for supplying electric power to the primary load, and a control unit which performs control operation to transmit electric power between the primary conversion circuit and the secondary conversion circuit.

In addition, a power conversion circuit system according to the present invention comprises the above-described power conversion circuit, a secondary load connected to the third input/output port, a secondary power source connected to the fourth input/output port for supplying electric power to the secondary load, a primary capacitor connected to the first input/output port, a primary power source connected to the second input/output port for supplying electric power to the primary capacitor, and a control unit which performs control operation in such a manner that a stationary power component in required power of the secondary load is supplied from the secondary power source to the secondary load, while a sudden transient power component in the required power of the secondary load is supplied from the primary capacitor to the secondary load.

Further, a power conversion circuit system according to the present invention comprises the above-described power conversion circuit, a secondary load connected to the third input/output port, a secondary capacitor connected to the fourth input/output port, a first primary capacitive power source connected to the first input/output port, a second primary capacitive power source connected to the second input/output port, and a control unit which performs control operation in such a manner that a stationary power component in required power of the secondary load is supplied from the first primary capacitive power source to the secondary load, while a sudden transient power component in the required power of the secondary load is supplied from the secondary capacitor to the secondary load.

Further, a power conversion circuit system according to the present invention comprises the above-described power conversion circuit, a secondary load connected to the third input/output port, a first secondary capacitor connected to the third input/output port in parallel with the secondary load, a second secondary capacitor connected to the fourth input/output port, a primary load connected to the first input/output port, a primary capacitor connected to the first input/output port in parallel with the primary load, a primary power source connected to the second input/output port for supplying electric power to the primary load, and a control unit which performs control operation to transmit electric power between the primary conversion circuit and the secondary conversion circuit.

Still further, in the power conversion circuit system according to the present invention, the control unit preferably comprises a transmission controlling section which performs control operation to transmit electric power from the primary power source via the primary and secondary conversion circuits to the secondary load, a phase difference adjusting section which adjusts a phase difference between the primary conversion circuit and the secondary conversion circuit in light of feedback on transmission power from the primary power source to the secondary load to ensure that the transmission power from the primary source to the secondary load is maintained equal to predetermined power, a step-up controlling section which performs control operation to step up a voltage of output power of the second secondary capacitor in such a manner that stepped up power supplied from the second secondary capacitor to the secondary load is equal to differential power between required power of the secondary load and the transmission power from the primary power source to the secondary load, and a step up duty ratio adjusting section which adjusts a step up duty ratio used for stepping up the output power of the second secondary capacitor, in light of feedback on a voltage across the secondary load to ensure that the voltage across the secondary load is maintained at the predetermined power.

Furthermore, in the power conversion circuit system according to the present invention, the control unit preferably comprises a step-up controlling section which performs control operation to step up output power of the second secondary capacitor, a step-up duty ratio adjusting section which adjusts a step-up duty ratio used for stepping up the output power of the second secondary capacitor, in light of feedback on a voltage across the secondary load to ensure that the voltage across the secondary load is maintained at a predetermined voltage, a transmission controlling section which performs control operation to transmit electric power from the primary power source via the primary and secondary conversion circuits to the second secondary capacitor, and a phase difference adjusting section which adjusts a phase difference between the primary conversion circuit and the secondary conversion circuit, in light of feedback on a voltage across the second secondary capacitor to ensure that the voltage of the second secondary capacitor is maintained at a predetermined value.

Moreover, in the power conversion circuit system according to the present invention, the control unit preferably comprises a step-up controlling section which performs control operation to step up output power of the second secondary capacitor, a step-up duty ratio adjusting section which adjusts a step-up duty ratio used for stepping up the output power of the second secondary capacitor, in light of feedback on a voltage across the secondary load to ensure that the voltage across the secondary load is maintained at a predetermined voltage, and in light of feedback on electric power of the second secondary capacitor to ensure that the electric power of the second secondary capacitor is maintained equal to predetermined power, a transmission controlling section which performs control operation to transmit electric power from the primary power source to the secondary load in such a manner that the electric power transmitted from the primary power source via the primary and secondary conversion circuits to the secondary load is equal to predetermined electric power, and a phase difference adjusting section which adjusts a phase difference between the primary and secondary conversion circuits in light of feedback on the transmission power from the primary power source to the secondary load to ensure that the transmission power from the primary power source to the secondary load is maintained equal to the predetermined electric power.

BRIEF DESCRIPTION OF THE DRAWINGS

Preferred embodiments of the present invention will be described in detail based on the following drawings, wherein:

FIG. 2 shows a timing chart related to supply voltages which are applied to the power conversion circuit through control operation of a control circuit in the embodiment of the present invention;

DESCRIPTION OF THE PREFERRED EMBODIMENTS

Figure 1:
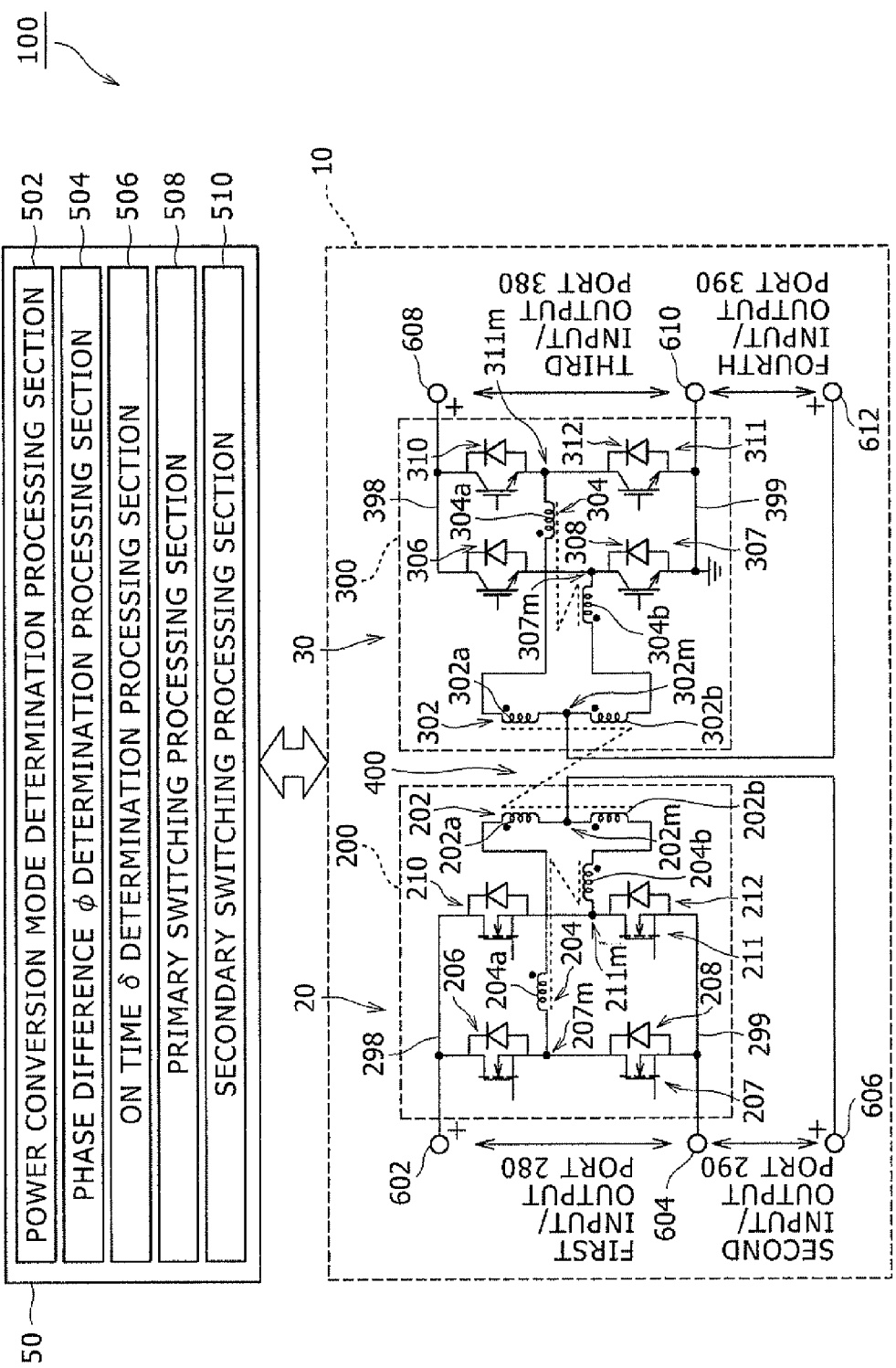
FIG. 1 shows a power conversion circuit system including a power conversion circuit in an embodiment of the present invention.

Hereinafter, embodiments according to the present invention will be described in detail with reference to the accompanying drawings. In the drawings, identical components are identified by identical reference numerals throughout the drawings, and the descriptions related to these components will not be repeated.

FIG. 1 is a diagram showing a power conversion circuit system 100 including a power conversion circuit 10. The power conversion circuit system 100 comprises the power conversion circuit 10 and a control circuit 50. The power conversion circuit 10 has a function of selecting any two input/output ports from among four input/output ports, and converting electric power between the selected two input/output ports. The power conversion circuit 10 includes a primary conversion circuit 20 and a secondary conversion circuit 30. The primary conversion circuit 20 is magnetically coupled to the secondary conversion circuit 30 by a transformer (a center tap transformer) 400.

The primary conversion circuit 20 comprises a primary full bridge circuit 200, a first input/output port 280, and a second input/output port 290. The primary full bridge circuit 200 includes a primary coil 202 in the transformer 400, a primary magnetic coupling reactor 204, a primary left upper arm 206, a primary left lower arm 208, a primary right upper arm 210, and a primary right lower arm 212. Here, each of the primary left upper arm 206, the primary left lower arm 208, the primary right upper arm 210, and the primary right lower arm 212 is composed of a MOS transistor and a diode connected in parallel to the MOS transistor.

A primary left arm circuit 207 in which the primary left upper arm 206 and the primary left lower arm 208 are serially connected is inserted between a primary positive bus bar 298 and a primary negative bus bar 299. Further, a primary right arm circuit 211 in which the primary right upper arm 210 and the primary right lower arm 212 are serially connected is disposed in parallel with the primary left arm circuit 207 between the primary positive bus bar 298 and the primary negative bus bar 299.

The primary coil 202 and the primary magnetic coupling reactor 204 are disposed in a bridge section for connecting a midpoint 207*m* of the primary left arm circuit 207 and a midpoint 211*m* of the primary right arm circuit 211. A connecting relationship in the bridge section will be described in detail below. The midpoint 207*m* of the primary left arm circuit 207 is connected to one end of a primary magnetic coupling reactor 204*a*. The other end of the primary magnetic coupling reactor 204*a* is connected to one end of the primary coil 202. Further, the other end of the primary coil 202 is connected to one end of a primary magnetic coupling reactor 204*b*. Still further, the other end of the primary magnetic coupling reactor 204*b* is connected to the midpoint 211*m* of the primary right arm circuit 211. It should be noted that the primary magnetic coupling reactor 204 is composed of the primary magnetic coupling reactor 204*a* and the primary magnetic coupling reactor 204*b* which is magnetically coupled to the primary magnetic coupling reactor 204*a*.

The first input/output port 280 is a port provided between the primary positive bus bar 298 and the primary negative bus bar 299. The first input/output port 280 is configured so as to include terminals 602 and 604. The second input/output port 290 is a port provided between the primary negative bus bar 299 and a center tap 202*m* of the primary coil 202. The second input/output port is configured so as to include the terminal 604 and a terminal 606.

The secondary conversion circuit 30 comprises a secondary full bridge circuit 300, a third input/output port 380, and a fourth input/output port 390. The secondary full bridge circuit 300 includes a secondary coil 302 in the transformer 400, a secondary magnetic coupling reactor 304, a secondary left upper arm 306, a secondary left lower arm 308, a secondary right upper arm 310, and a secondary right lower arm 312. Here, each of the secondary left upper arm 306, the secondary left lower arm 308, the secondary right upper arm 310, and the secondary right lower arm 312 is composed of a bipolar transistor and a diode connected in parallel to the bipolar transistor.

A secondary left arm circuit 307 in which the secondary left upper arm 306 and the secondary left lower arm 308 are connected in series is disposed between a secondary positive bus bar 398 and a secondary negative bus bar 399. Further, a secondary right arm circuit 311 in which the secondary right upper arm 310 and the secondary right lower arm 312 are connected in series is disposed in parallel with the secondary left arm circuit 307 between the secondary positive bus bar 398 and the secondary negative bus bar 399.

The secondary coil 302 and the secondary magnetic coupling reactor 304 are disposed in a bridge section for connecting a midpoint 307*m* of the secondary left arm circuit 307 and a midpoint 311*m* of the secondary right arm circuit 311. A connecting relationship in the bridge section will be described in detail below. The midpoint 311*m* of the secondary right arm circuit 311 is connected to one end of a secondary magnetic coupling reactor 304*a*. The other end of the secondary magnetic coupling reactor 304*a* is connected to one end of the secondary coil 302. Further, the other end of the secondary coil 302 is connected to one end of a secondary magnetic coupling reactor 304*b*. Still further, the other end of the secondary magnetic coupling reactor 304*b* is connected to the midpoint 307*m* of the secondary left arm circuit 307. It should be noted that the secondary magnetic coupling reactor 304 is composed of the secondary magnetic coupling reactor 304*a* and the secondary magnetic coupling reactor 304*b*, which is magnetically coupled to the secondary magnetic coupling reactor 304*a*.

The third input/output port 380 is a port disposed between the secondary positive bus bar 398 and the secondary negative bus bar 399. The third input/output port 380 is configured so as to include terminals 608 and 610. The fourth input/output port 390 is a port disposed between the secondary negative bus bar 399 and a center tap 302*m* of the secondary coil 302. The fourth input/output port 390 is configured so as to include the terminal 610 and a terminal 612.

The control circuit 50 functions to control switching of switching elements (such as the MOS transistor or the bipolar transistor) in the primary conversion circuit 20 and the secondary conversion circuit 30. The control circuit 50 comprises a power conversion mode determination processing section 502, a phase difference φ determination processing section 504, an ON time δ determination processing section 506, a primary switching processing section 508, and a secondary switching processing section 510.

The power conversion mode determination processing section 502 selects, based on an unillustrated external signal, an operation mode from among power conversion modes A to L, which will be described below, of the power conversion circuit 10. The power conversion mode includes a mode A in which electric power input from the first input/output port 280 is converted and output to the second input/output port 290, a mode B in which electric power input from the first input/output port 280 is converted and output to the third input/output port 380, and a mode C in which electric power input from the first input/output port 280 is converted and output to the fourth input/output port 390.

Further, the power conversion mode also includes a mode D in which electric power input from the second input/output port 290 is converted and output to the first input/output port 280, a mode E in which electric power input from the second input/output port 290 is converted and output to the third input/output port 380, and a mode F in which electric power input from the second input/output port 290 is converted and output to the fourth input/output port 390.

Still further, the power conversion mode also includes a mode G in which electric power input from the third input/output port 380 is converted and output to the first input/output port 280, a mode H in which electric power input from the third input/output port 380 is converted and output to the second input/output port 290, and a mode I in which electric power input from the third input/output port 380 is converted and output to the fourth input/output port 390.

Moreover, the power conversion mode also includes a mode J in which electric power input from the fourth input/output port 390 is converted and output to the first input/output port 280, a mode K in which electric power input from the fourth input/output port 390 is converted and output to the second input/output port 290, and a mode L in which electric power input from the fourth input/output port 390 is converted and output to the third input/output port 380.

The phase difference φ determination processing section 504 has a function of setting a phase difference φ in switching cycle between the switching elements of the primary conversion circuit 20 and the secondary conversion circuit 30 for causing the power conversion circuit 10 to function as a DC-DC converter circuit.

The ON time δ determination processing section 506 has a function of setting an ON time δ of each switching element in the primary conversion circuit 20 and the secondary conversion circuit 30 for causing the primary conversion circuit 20 and the secondary conversion circuit 30 to function as a step-up circuit and a step-down circuit, respectively.

The primary switching processing section 508 functions to control switching of each switching element (the MOS transistor) in the primary left upper arm 206, the primary left lower arm 208, the primary right upper arm 210, and the primary right lower arm 212 based on outputs from the power conversion mode determination processing section 502, the phase difference φ determination processing section 504, and the ON time δ determination processing section 506.

The secondary switching processing section 510 functions to control switching of each switching element (the bipolar transistor) in the secondary left upper arm 306, the secondary left lower arm 308, the secondary right upper arm 310, and the secondary right lower arm 312 based on outputs from the power conversion mode determination processing section 502, the phase difference φ determination processing section 504, and the ON time δ determination processing section 506.

Operation of the above-described power conversion circuit system 100 will be described with reference to FIG. 1. When an external signal requesting the power conversion circuit 10 to operate with the power conversion mode of the mode F is input, the power conversion mode determination processing section 502 in the control circuit 50 determines the mode F as the power conversion mode of the power conversion circuit 10. In this mode, a voltage input to the second input/output port 290 is stepped up by a step-up function of the primary conversion circuit 20. The stepped-up voltage is transmitted to a third input/output port side by the power conversion circuit 10 functioning as the DC-DC converter circuit, and stepped down by a step-down function of the secondary power conversion circuit 30. Then, the stepped-down voltage is output from the fourth input/output port 390.

Now, the step-up and step-down functions of the primary conversion circuit 20 will be described in detail. Referring to the second input/output port 290 and the first input/output port 280, the terminal 606 of the second input/output port 290 is connected, via the primary coil 202a and the primary magnetic coupling reactor 204a connected in series with the primary coil 202a, to the midpoint 207m of the primary left arm circuit 207. Then, both ends of the primary left arm circuit 207 are connected to the first input/output port 280, to thereby provide a step-up and step-down circuit between the terminal 606 of the second input/output port 290 and the first input/output port 280.

Further, the terminal 606 of the second input/output port 290 is connected, via the primary coil 202b and the primary magnetic coupling reactor 204b connected in series with the primary coil 202b, to the midpoint 211m of the primary right arm circuit 211. Then, both ends of the primary right arm circuit 211 are connected to the first input/output port 280, to thereby provide the step-up and step-down circuit connected in parallel between the terminal 606 of the second input/output port 290 and the first input/output port 280. Note that because the secondary conversion circuit 30 has a configuration almost identical to that of the primary conversion circuit 20, two step-up and step-down circuits are connected in parallel between the terminal 612 of the fourth input/output port 390 and the third input/output port 380. Thus, the secondary conversion circuit 30 has the step-up and step-down functions as in the case of the primary conversion circuit 20.

Next, the function of the power conversion circuit 10 as the DC-DC converter circuit will be described in detail. Referring to the first input/output port 280 and the third input/output port 380, the primary full bridge circuit 200 is connected to the first input/output port 280, while the secondary full bridge circuit 300 is connected to the third input/output port 380. Then, a function as the transformer 400 (a center tap transformer having a turn ratio of 1:N) is obtained through magnetic coupling between the primary coil 202 inserted in the bridge section of the primary full bridge circuit 200 and the secondary coil 302 inserted in the bridge section of the secondary full bridge circuit 300. Therefore, the function can be achieved by appropriately adjusting a phase difference in switching cycle between the switching elements of the primary full bridge circuit 200 and the secondary full bridge circuit 300 such that electric power input to the first input/output port 280 is converted and transmitted to the third input/output port 380, or that electric power input to the third output input/port 380 is converted and transmitted to the first input/output port 280.

FIG. 2 shows a timing chart for a supply voltage applied to the power conversion circuit 10. In FIG. 2, $V_{U1}$ represents an electric potential at the midpoint 207m of the primary left arm circuit 207, $V_{V1}$ represents an electric potential at the midpoint 211m of the primary right arm circuit 211, $V_{U2}$ represents an electric potential at the midpoint 307m of the secondary left arm circuit 307, and $V_{V2}$ represents an electric potential at the midpoint 311m of the secondary right arm circuit 311.

Here, a step-up or step-down ratio in the primary conversion circuit 20 and the secondary conversion circuit 30 can be changed by changing the ON time δ for each of $V_{U1}$, $V_{V1}$, $V_{U2}$, and $V_{V2}$. Further, a phase difference between $V_{U1}$ and $V_{V1}$ is set to 180 degrees (π) for the primary conversion circuit 20 to operate, while a phase difference between $V_{U2}$ and $V_{V2}$ is set to 180 degrees (π) for the secondary conversion circuit 30 to operate. In addition, an amount of electric power transmitted between the primary conversion circuit 20 and the secondary conversion circuit 30 can be adjusted by changing the phase difference φ between $V_{U1}$ and $V_{U1}$ in such a manner that electric power is transmitted from the primary conversion circuit 20 to the secondary conversion circuit 30 by setting such that the phase difference φ>0, or transmitted from the secondary conversion circuit 30 to the primary conversion circuit 20 by setting such that the phase difference φ<0.

Thus, when the external signal requesting the power conversion circuit 10 to operate with the power conversion mode of the mode F is input, the power conversion mode determination processing section 502 determines to select the mode F. Then, the ON time δ determination processing section 506 establishes the ON time δ which defines the step-up ratio used for allowing the primary conversion circuit 20 to function as the step-up circuit in which a voltage input to the second input/output port 290 is stepped up and output to the first input/output port 280. It should be noted that the secondary conversion circuit 30 is caused to function as the step-down circuit in which a voltage input to the third input/output port 380 is stepped down at the step-down ratio defined by the ON time δ which is established in the On time δ determination processing section 506, and output to the fourth input/output port 390. In addition, the phase difference φ determination processing section 504 establishes a phase difference φ suitable for transmitting the electric power input to the first input/output port 280 at a desired rate of electric power transmission to the third input/output port 290.

The primary switching processing section 508 controls switching of each switching element in the primary left upper arm 206, the primary left lower arm 208, the primary right upper arm 210, and the primary right lower arm 212 in such a manner that the primary conversion circuit 20 is caused to function as both the step-up circuit and a part of the DC-DC converter circuit.

The secondary switching processing section 510 controls switching of each switching element in the secondary left upper arm 306, the secondary left lower arm 308, the secondary right upper arm 310, and the secondary right lower arm 312 in such a manner that the second conversion circuit 30 is caused to function as both the step-down circuit and a part of the DC-DC converter circuit.

As described above, the primary conversion circuit 20 and the secondary conversion circuit 30 can be operated to function as the step-up circuit or the step-down circuit, and the power conversion circuit 10 can be operated to function as a two-way DC-DC converter circuit. Accordingly, power conversion in all of the power conversion modes A to F can be performed; i.e. electric power can be converted between two input/output ports selected from among the four input/output ports.

Figure 3:
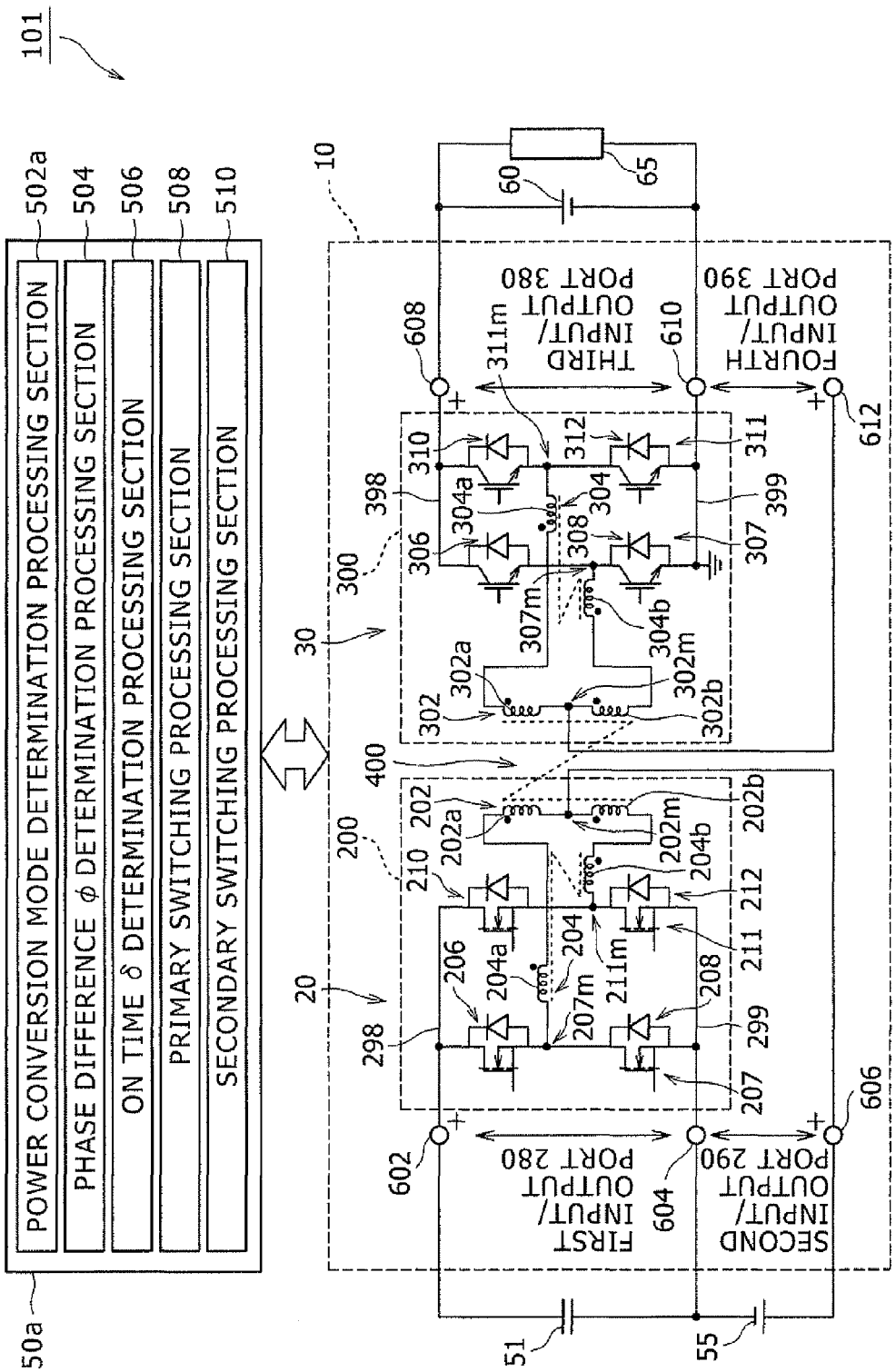
FIG. 3 shows a first example of the power conversion circuit system in the embodiment of the present invention.

Next, a power conversion circuit system 101 including a load or other components connected to the power conversion circuit 10 will be described. FIG. 3 shows the power conversion circuit system 101. The power conversion circuit system 101 comprises the power conversion circuit 10, a control circuit 50a, a capacitor 51 connected to the first input/output port 280, a power source 55 connected to the second input/output port 290, a load 65 connected to the third input/output port 380, and a power source 60 connected to the third input/output port 380 in parallel with the load 65. The difference between the power conversion circuit system 101 and the power conversion circuit system 100 lies in the capacitor 51, the power source 55, the load 65, and the power source 60 contained in the power conversion circuit system 101, and in a function of a power conversion mode determination processing section 502a in the control circuit 50a, which will be mainly explained in the description below.

The load 65 is a motor generator capable of powering and regeneration. The power source 60 is a main battery (energy storage element) for supplying electric power in response to required power of the load 65. The power source 55 is a battery (energy storage element) having temperature characteristics in which output power is not reduced even at low temperature and having a capability of being rapidly charged and discharged. In addition, the power source 55 is capable of functioning as an auxiliary battery to be used in place of the power source 60 for supplying electric power in response to the required power of the load 65 when the power source 60 of the main battery has the temperature characteristics exhibiting reduction in output power at the low temperature. The capacitor 51 is an energy storage element for storing a voltage stepped up by the primary conversion circuit 20.

The power conversion mode determination processing section 502a determines, in normal times, a mode of stepping up the voltage input to the second input/output port 290 from the power source 55 and outputting the stepped-up voltage to the first input/output port 280 for charging the capacitor 51. In other words, in normal times the power conversion mode determination processing section 502a operates the power conversion circuit 10 with the mode D. When finding, based on information obtained from a monitor for monitoring a voltage of the power source 60 or other components, that a power supply from the power source 60 to the load 65 is insufficient, the power conversion mode determination processing section 502a determines to transmit electric power in such a manner that the electric power can be supplied from the power source 55 to the load 65. Specifically, the power conversion mode determination processing section 502a changes the mode D to the mode E for the power conversion circuit 10 to operate with the mode E when the power supply from the power source 60 to the load 65 is insufficient.

Operation of the thus-configured power conversion circuit system 101 will be described with reference to FIG. 3. In the power conversion circuit system 101, because the required power of the load 65 is normally supplied only from the power source 60 which serves as the main battery, the power conversion circuit 10 is operated with the mode D. For this reason, the power conversion mode determination processing section 502a determines the mode D as the operation mode. Then, the secondary switching processing section 510 controls switching in such a manner that the switching element in the secondary conversion circuit 30 is disabled in a state of performing no switching operation. Because the secondary conversion circuit 30 is in the disabled state, the phase difference φ determination processing section 504 determines that the phase difference φ is 0. The ON time δ determination processing section 506 determines the ON time δ suitable for causing the primary conversion circuit 20 to step up the voltage at a predetermined step-up ratio. The primary switching processing section 508 controls switching in such a manner that the primary conversion circuit 20 functions as the step-up circuit for the ON time δ. In this way, the load 65 can be supplied with electric power using only the power source 60, while stepping up the voltage supplied to the second input port 290 from the power source 55 to charge the capacitor 51 with the stepped-up voltage.

Then, for example, when an operating temperature of the power conversion circuit system 101 decreases to a low temperature, the power supply from the power source 60 to the load 65 becomes insufficient, resulting in a drop in the voltage of the power source 60. Thereafter, when the power source 60 declines to a voltage which falls outside a predetermined range, the operation mode of the power conversion circuit 10 is established as the mode E to supply electric power to the load 65 from the power source 55 instead of the power source 60. To achieve this, the power conversion mode determination processing section 502a changes the mode D to the mode E. Then, the phase difference δ determination processing section 504 and the ON time δ determination processing section 506 respectively determine the phase difference φ and the ON time δ so as to step up the voltage input to the second input/output port 290 in the primary conversion circuit 20, output the stepped-up voltage to the first input/output port 290, and allow power transmission between the primary conversion circuit 20 and the secondary conversion circuit 30. Then, the primary switching processing section 508 and the secondary switching processing section 510 control switching of the switching elements in the primary and secondary conversion circuits 20 and 30 based on the determined phase difference φ and ON time δ. In this way, when the power supply from the main battery of the power source 60 is less than the required power of the load 65, electric power can be supplied to the load 65 from the power source 55 which serves as the auxiliary battery, while the load 65 can be charged by means of the power source 55.

Figure 4:
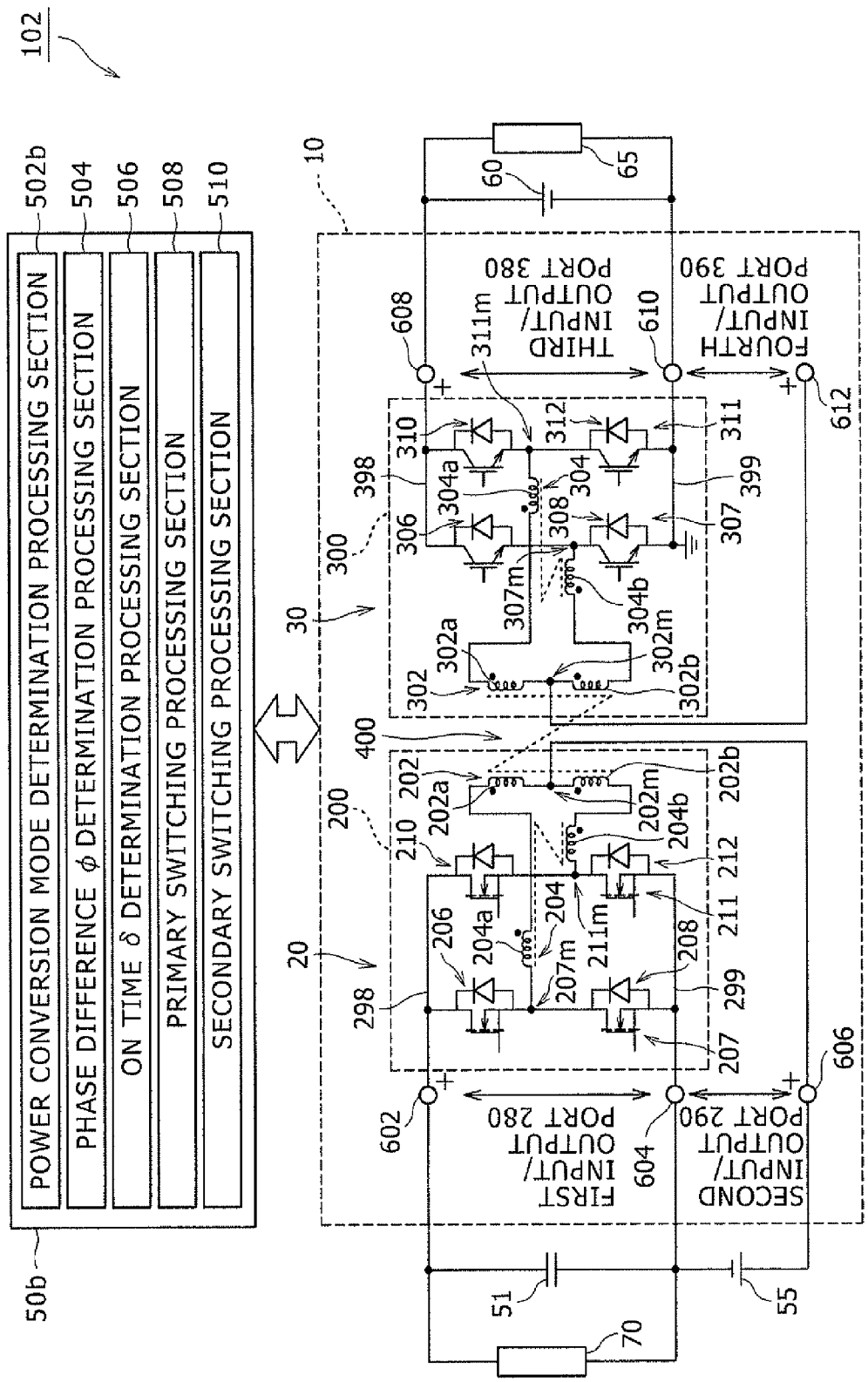
FIG. 4 shows a second example of the power conversion circuit system in the embodiment of the present invention.

Next, there will be described a power conversion circuit system 102 in which the power conversion circuit 10 is connected to a load or other components. FIG. 4 shows the power conversion circuit system 102. The power conversion circuit system 102 comprises the power conversion circuit 10, a control circuit 50b, the capacitor 51 connected to first input/output port 280, a load 70 connected to the first input/output port 280 in parallel with the capacitor 51, the power source 55 connected to the second input/output port 290, the load 65 connected to the third input/output port 380, and the power source 60 connected to the third input/output port 380 in parallel with the load 65. The difference between the power conversion circuit system 102 and the power conversion system 100 lies in the capacitor 51, the power source 55, the load 65, and the power source 60 provided to the power conversion circuit system 102, and in a function of a power conversion mode determination processing section 502b in the control circuit 50b, which will be mainly described below.

The load 65 is a motor generator capable of powering and regeneration. The power source 60 serves as the main battery (energy storage element) for supplying electric power in response to the required power of the load 65. The load 70 is a load element whose required voltage is 48 V. The capacitor 51 serves as the energy storage element for storing the voltage stepped up by the primary conversion circuit 20. The power source 55 is a battery (energy storage element) which outputs a voltage of 12 V. Then, the voltage of 12 V output from the power source 55 is stepped up (increased by a step up ratio of 4) in the power conversion circuit 10, and supplied via the capacitor 51 to the load 70.

The power conversion mode determination processing section 502b determines, in normal times, a mode of stepping up the voltage of 12 V output from the power source 66 to four times, and supplying the stepped-up voltage via the capacitor 51 to the load 70, which requires the voltage of 48 V. In other words, the power conversion mode determination processing section 502b operates the power conversion circuit 10 with the mode D in normal tunes. Then, when finding, based on the information obtained from the monitor for monitoring the voltage of the power source 60 or other components, that the power supply from the power source 60 to the load 65 is insufficient, the power conversion mode determination processing section 502b determines to transmit electric power from the primary conversion circuit 20 to the secondary conversion circuit 30 so that electric power can be supplied from the load 70 to the load 65. In other words, when the power supply from the power source 60 to the load 65 is insufficient, the power conversion mode determination processing section 502b changes the mode D to the mode B for the power conversion circuit 10 to operate with the mode B.

Operation of the thus-configured power conversion circuit system 102 will be described with reference to FIG. 4. In the power conversion circuit system 102, because the required power of the load 65 is normally supplied only from the power source 60, the power conversion circuit 10 is operated with the mode D in normal times. For this reason, the power conversion mode determination processing section 502b determines the mode D as the operation mode. Then, the secondary switching processing section 510 controls switching in such a manner that the switching element in the secondary conversion circuit 30 is disabled in a state of performing no switching operation. Because the secondary conversion circuit 30 is in the disabled state, the phase difference $\phi$ determination processing section 504 determines that the phase difference $\phi$ is 0. The ON time $\delta$ determination processing section 506 determines the ON time $\delta$ suitable for causing the primary conversion circuit 20 to step up the voltage of 12 V input from the power source 55 to a voltage of 48 V multiplied by a factor of four, and supply the stepped up voltage of 48 V to the load 70. The primary switching processing section 508 controls switching in such a manner that the primary conversion circuit 20 functions as the step up circuit for the ON time $\delta$. In this way, the load 65 can be supplied with electric power using only the power source 60, while supplying the load 70 with the voltage of 48 V stepped up from the voltage of 12 V input from the power source 55.

Then, when the electric power supplied from the power source 60 to the load 65 becomes insufficient, the voltage of the power source 60 declines. When the power source 60 declines to a voltage which falls outside the predetermined range, the operation mode of the power conversion circuit 10 is established as the mode B to supply electric power to the load 65 from the capacitor 51 instead of the power source 60. To achieve this, the power conversion mode determination processing section 502a changes the mode D to the mode B. At this time, the phase difference 9 determination processing section 504 and the ON time $\delta$ determination processing section 506 respectively determine the phase difference $\phi$ and the ON time $\delta$ suitable for transmitting electric power between the primary conversion circuit 20 and the secondary conversion circuit 30. The primary switching processing section 508 and the secondary switching processing section 510 control switching of the switching elements in the primary and secondary conversion circuits 20 and 30 based on the determined phase difference $\phi$ and ON time $\delta$. In this way, when the power supply from the power source 60 is less than the required power of the load 65, the electric power can be supplied from the capacitor 51 to the load 65, while charging the load 65 by means of the capacitor 51. It should be noted that, in the power conversion circuit system 102, electric power can be mutually transmitted between the loads 65 and 70 by adjusting the phase difference $\phi$ as appropriate.

Figure 5:
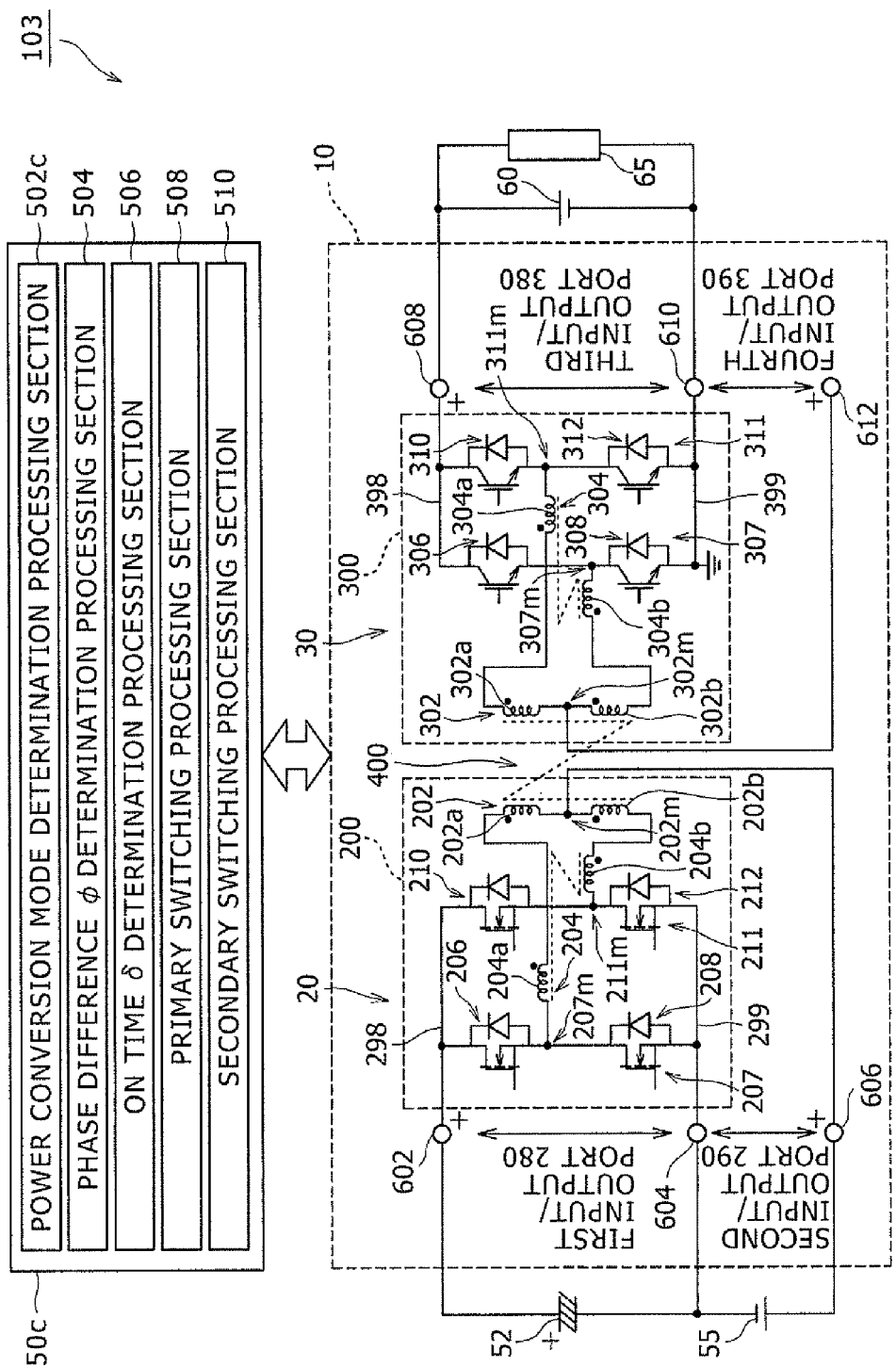
FIG. 5 shows a third example of the power conversion circuit system in the embodiment of the present invention.

Next, a power conversion circuit system 103 including a load or other components connected to the power conversion circuit 10 will be described below. FIG. 5 shows the power conversion circuit system 103. The power conversion circuit system 103 comprises the power conversion circuit 10, a control circuit 50c, the capacitor 52 connected to first input/output port 280, the power source 55 connected to the second input/output port 290, the load 65 connected to the third input/output port 380, and the power source 60 connected to the third input/output port 380 in parallel with the load 65. As the power conversion circuit system 103 differs from the power conversion system 100 in the capacitor 52, the power source 55, the load 65, and the power source 60 provided to the power conversion circuit system 103, and in a function of a power conversion mode determination processing section 502c in the control circuit 50c, focus is placed on the differences in the description below.

The load 65 is the motor generator capable of powering and regeneration. The power source 60 is the main battery (energy storage element) for supplying electric power in response to the required power of the load 65. The power source 55 is the auxiliary battery (the energy storage element) to be used in place of the power source 60 for supplying the required power of the load 65. The capacitor 52 is the energy storage element for storing the voltage stepped up by the primary conversion circuit 20, and configured as an electric double layer capacitor whose output characteristics are superior to those of the power sources 60 and 55.

The power conversion mode determination processing section 502c determines in normal times that the voltage input from the power source 55 is stepped up and output to the first input/output port 280 for charging the capacitor 52. In other words, the power conversion mode determination processing section 502c operates the power conversion circuit 10 with the mode D for a stationary power component in the required power of the load 65. When detecting, based on the information obtained from the monitor for monitoring the voltage of the power source 60 or other components, a transient power component in the required power of the load 65, the power conversion mode determination processing section 502c determines that power transmission is performed for the transient power component in the required power of the load 65 in such a manner that electric power is supplied from the capacitor 52 to the load 65. That is, the power conversion mode determination processing section 502c operates the power conversion circuit 10 with the mode D for the stationary power component in the required power of the load 65 in order to supply electric power from the power source 60 to the load 65. Meanwhile, the power conversion mode determination processing section 502c changes the mode and operates the power conversion circuit 10 with the mode B for the transient power component in the required power of the load 65 in order to supply electric power from the capacitor 52 to the load 65.

Operation of the thus-configured power conversion circuit system 103 will be described with reference to FIG. 5. In the power conversion circuit system 103, the power conversion circuit 10 is operated with the mode D for the stationary power component in the required power of the load 65 in order to supply electric power only from the load 65. For this reason, the power conversion mode determination processing section 502c determines the mode D as the operation mode. At this time, the secondary switching processing section 510 controls switching in such a manner that the switching element in the secondary conversion circuit 30 is disabled in a state of performing no switching operation. Because the secondary conversion circuit 30 is in the disabled state, the phase difference φ determination processing section 504 determines that the phase difference φ is 0. The ON time δ determination processing section 506 determines the ON time δ suitable for allowing the primary conversion circuit 20 to step up the voltage at the predetermined step up ratio. The primary switching processing section 508 controls switching in such a manner that the primary conversion circuit 20 functions as the step-up circuit for the ON time δ. In this way, the electric power can be supplied to the load 65 only from the power source 60 with respect to the stationary power component in the required power of the load 65, while stepping up the voltage supplied to the second input/output port 290 from the power source 55 and charging the capacitor 52 with the stepped-up voltage.

Then, when a voltage state of the power source 60 falls outside the predetermined range due to voltage drop of the power source 60, the presence of a transit power component in the required power of the load 65 is determined. Upon the determination, the operation of the power conversion circuit 10 is changed to the mode B for operating the power conversion circuit 10 to supply electric power to the load 65 from the capacitor 52 instead of the power source 60. To achieve this, the power conversion mode determination processing section 502c changes the operation mode from the mode D to the mode B. At this time, the phase difference φ determination processing section 504 and the ON time δ determination processing section 506 respectively determine the phase difference φ and the ON time δ suitable for transmitting electric power between the primary conversion circuit 20 and the secondary conversion circuit 30. Then, the primary switching processing section 508 and the secondary switching processing section 510 control switching of the switching elements in the primary and secondary conversion circuits 20 and 30 based on the determined phase difference φ and ON time δ. In this way, the electric power can be supplied to the load 65 from the power source 60 with respect to the stationary power component in the required power of the load 65, while the electric power can be supplied from the capacitor 52 to the load 65 with respect to the transient power component in the required power of the load.

Figure 6:
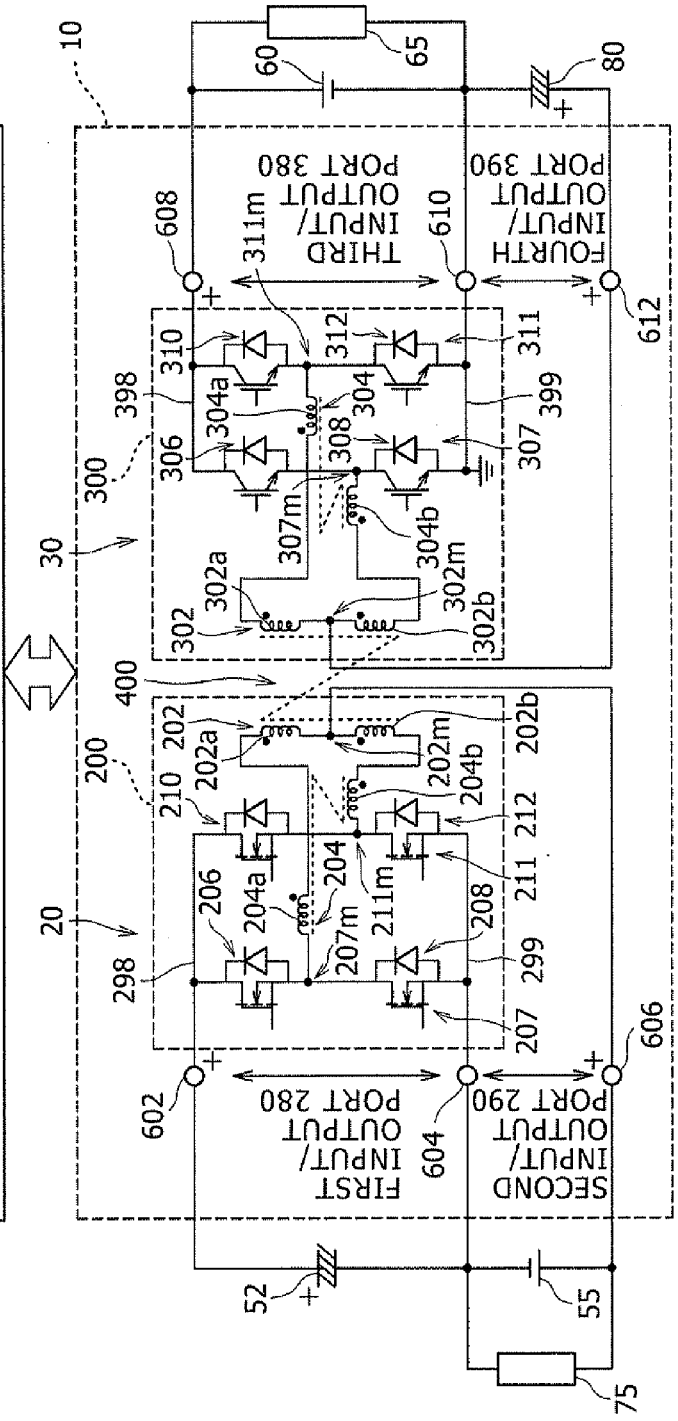
FIG. 6 shows a fourth example of the power conversion circuit system in the embodiment of the present invention.

Next, a power conversion circuit system 104 including a load or other components connected to the power conversion circuit 10 will be described below. FIG. 6 shows the power conversion circuit system 104. The power conversion circuit system 104 comprises the power conversion circuit 10, a control circuit 50d, the capacitor 52 connected to first input/output port 280, the power source 55 connected to the second input/output port 290, a load 75 connected to the second input/output port 290 in parallel with the power source 55, the load 65 connected to the third input/output port 380, the power source 60 connected to the third input/output port 380 in parallel with the load 65, and a capacitor 80 connected to the fourth input/output port 390. As the power conversion circuit system 104 differs from the power conversion system 100 in the capacitor 52, the power source 55, the load 65, the power source 60, the load 75, and the capacitor 80 provided to the power conversion circuit system 104, and in a function of a power conversion mode determination processing section 502d in the control circuit 50d, focus is placed on these differences in the description below.

The load 65 is the motor generator capable of powering and regeneration. The power source 60 is a main battery (energy storage element) which supplies a voltage of 200 V to the required power of the load 65. The power source 55 is an auxiliary battery (energy storage element) to be used in place of the power source 60 for outputting the voltage of 12 V to supply the required power of the load 65. The capacitor 52 is an energy storage element for storing the voltage stepped up by the primary conversion circuit 20, and configured as a electric double layer capacitor whose output characteristics are superior to those of the power sources 60 and 55. The capacitor 80 is an energy storage element for storing the voltage stepped down by the secondary conversion circuit 30, and configured as the electric double layer capacitor whose output characteristics are superior to those of the power sources 60 and 55. The load 75 is a load element that requires electric power including a stationary power component and a transient power component.

The power conversion mode determination processing section 502d determines in normal times that the voltage input from the power source 55 is stepped up and output to the first input/output port 280 for charging the capacitor 52. In other words, the power conversion mode determination processing section 502c operates the power conversion circuit 10 with the operation mode set to the mode D for the stationary power component in the required power of the load 65. Then, when detecting the transient power component in the required power based on the information obtained from the monitor for monitoring the voltage of the power source 60 or other components, the power conversion mode determination processing section 502c performs power transmission for the transit power component of the required power in such a manner that the load can be supplied with electric power from the capacitor 52 of the primary conversion circuit 20. That is to say, the power conversion mode determination processing section 502c operates the power conversion circuit 10 with the mode D for the stationary power component in the required power of the load 65 in order to supply electric power from the power source 60 to the load 65. On the other hand, the power conversion mode determination processing section 502c changes the operation mode of the power conversion circuit 10 to the mode B for transient power component in the required power of the load 65, thereby causing the power conversion circuit 10 to supply electric power from the capacitor 52 to the load 65.

Further, in a case where the power conversion mode determination processing section 502*d* detects the transient power component in the required power of the load 65, and accordingly causes the capacitor 52 to supply electric power to the load 65, when a response of the power conversion circuit 10 as the DC-DC converter circuit is found to be too slow relative to a response of the load 65, the power conversion mode determination processing section 502*d* determines an inability to optimally use the capacitor 52. Upon determination of the inability to optimally use the capacitor 52, the power conversion mode determination processing section 502*d* operates the power conversion circuit 10 with the mode L in order to preferentially supply the required power of the load 65 by means of the capacitor 80. To achieve this, the power conversion mode determination processing section 502*d* determines the mode L as the operation mode. Then, the primary switching processing section 508 controls switching in such a manner that the switching element in the primary conversion circuit 20 is disabled in a state of performing no switching operation. Because the primary conversion circuit 20 is in the disabled state, the phase difference φ determination processing section 504 determines that the phase difference φ is 0. The ON time δ determination processing section 506 determines the ON time δ suitable for causing the secondary conversion circuit 30 to step up the voltage at the predetermined step-up ratio. The secondary switching processing section 510 controls switching for the secondary conversion circuit 30 to function as the step-up circuit during the ON time δ. In this way, electric power stored in the capacitor 80 can be supplied to the load 65.

Operation of the thus-configured power conversion circuit system 104 will be described with reference to FIG. 6. In the power conversion circuit system 104, the power conversion circuit 10 is operated with the mode D to supply electric power only from the load 65 with respect to the stationary power component in the required power of the load 65. For this reason, the power conversion mode determination processing section 502*d* determines the mode D as the operation mode. Then, the secondary switching processing section 510 performs switching control in such a manner that the secondary conversion circuit 30 is disabled in a state of performing no switching operation. Because the secondary conversion circuit 30 is in the disabled state, the phase difference 9 determination processing section 504 determines that the phase difference φ is 0. The ON time δ determination processing section 506 determines the ON time δ suitable for allowing the primary conversion circuit 20 to step up the voltage at the predetermined step up ratio. The primary switching processing section 508 performs switching control for the primary conversion circuit 20 to function as the step-up circuit for the ON time δ. In this way, the electric power can be supplied only from the power source 60 with respect to the stationary power component in the required power of the load 65, while the voltage input from the power source 55 to the second input/output port 290 can be stepped up to charge the capacitor 52 with the stepped-up voltage.

Then, when the voltage state of the power source 60 falls outside the predetermined range due to the voltage drop of the power source 60, the required power of the load 65 is determined to be the transient power component. As a result, the power conversion circuit 10 is operated with the operation mode set to the mode B in order to supply electric power to the load 65 using the capacitor 52 in place of the power source 60.

To achieve this, the power conversion mode determination processing section 502*d* changes the operation mode from the mode D to the mode B. Then, the phase difference φ determination processing section 504 and the ON time δ determination processing section 506 respectively determine the phase difference φ and the ON time δ adequate to allow transmission of electric power between the primary conversion circuit 20 and the secondary conversion circuit 30. The primary switching processing section 508 and the secondary switching processing section 510 control switching of each switching element in the primary and secondary conversion circuits 20 and 30 based on the determined phase difference φ and ON time δ. In this way, the power source 60 can be used for supplying electric power to the load 65 with respect to the stationary power component in the required power of the load 65, whereas the capacitor 52 can be used for supplying electric power to the load 65 with respect to the transient power component in the required power of the load 65.

Further, in a case where electric power has been supplied from the capacitor 52 to the load 65 due to the presence of the transient power component detected in the required power of the load 65, when the inability to optimally use the capacitor 62 is determined based on a fact that the response of the power conversion circuit 10 serving as the DC-DC converter circuit is too slow to cope with the response of the load 65 in time, the operation mode of the power conversion circuit 10 is changed from the mode B to the mode L in order to preferentially use the capacitor 80 in place of the capacitor 52. Then, the phase difference φ determination processing section 504 and the ON time δ determination processing section 506 respectively determine the phase difference φ and the ON time δ which are adapted to place the primary conversion circuit 20 in the disabled state, and prevent the primary and secondary conversion circuits 20 and 30 from transmitting electric power to each other while allowing the secondary conversion circuit 30 to function as the step up circuit. Then, the primary and secondary switching processing sections 508 and 510 respectively control switching of each switching element in the primary and secondary conversion circuits 20 and 30 based on both the thus-determined phase difference φ and the thus-determined ON time δ. In this way, when it becomes impossible to optimally use the capacitor 52 in the case where the capacitor 52 has been used for supplying electric power to the load 65 in response to the transient power component in the required power of the load 65, the capacitor 80 can be preferentially used. It should be noted that although the example has been described in which the required power of the load 65 contains both the stationary power component and the transient power component, the required power of the load 75 containing both the stationary power component and the transient power component may be handled by the power conversion circuit system 104 in such a manner that the power source 55 is used for supplying electric power to the load 75 with respect to the stationary power component in the required power, while the capacitor 52 is used for supplying electric power to the load 75 with respect to the transient power component in the required power. Note that, also in the power conversion circuit system 104, the operation mode F may be established to charge the capacitor 80 with electric power from the power source 55.

As such, according to the power conversion circuit system 104, when the response of the power conversion circuit 10 functioning as the DC-DC converter circuit is too slow to cope with the response of the load 65 in time, resulting in the inability to optimally use the capacitor 52, operation can be completed within the solely used secondary conversion circuit 30. Therefore, an optimum step-up ratio can be established for the secondary conversion circuit 30 to step up the voltage without constraints on voltage associated with the step-up and step-down ratios of the primary conversion circuit 20 and the secondary conversion circuit 30.

Figure 7:
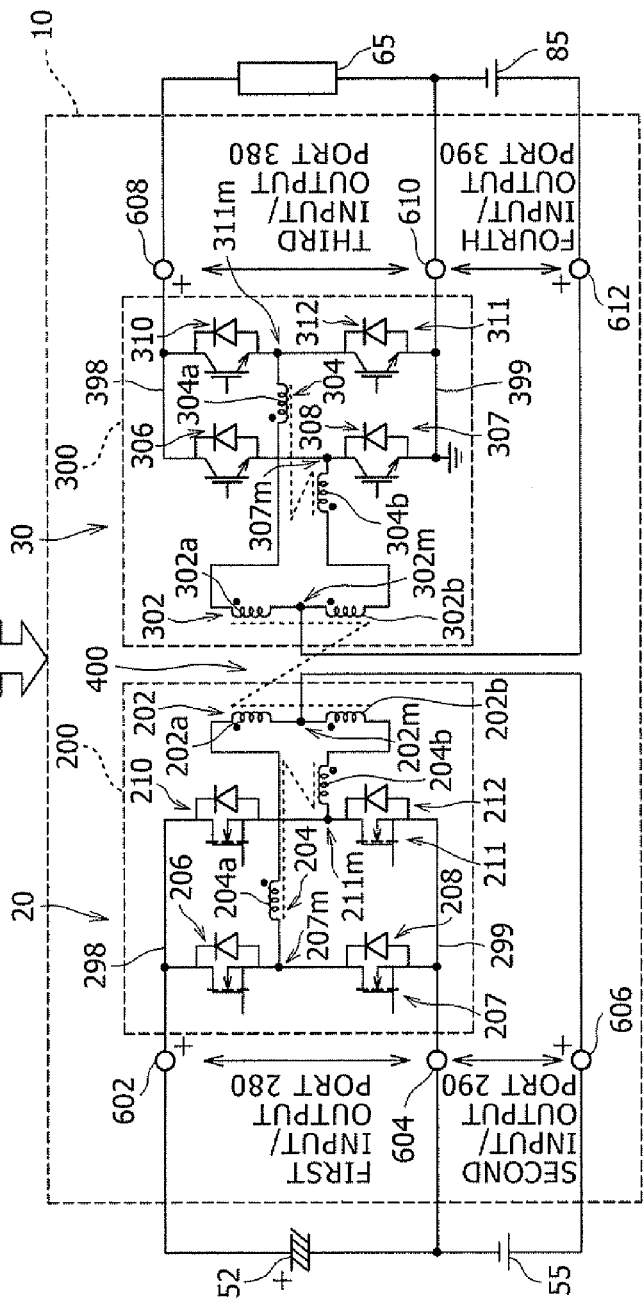
FIG. 7 shows a fifth example of the power conversion circuit system in the embodiment of the present invention.

Next, a power conversion circuit system 105 including the load or the like connected to the power conversion circuit 10 will be described below. FIG. 7 shows the power conversion circuit system 105. The power conversion circuit system 105 comprises the power conversion circuit 10, a control circuit 50e, the capacitor 52 connected to the first input/output port 280, the power source 55 connected to the second input/output port 290, the load 65 connected to the third input/output port 380, and a power source 85 connected to the fourth input/output port 390. The difference between the power conversion circuit system 105 and the power conversion circuit system 100 lies in the capacitor 52, the power source 55, the load 65, and the power source 85 contained in the power conversion circuit system 105, and in a function of a power conversion mode determination processing section 502e in the control circuit 50e, which will be mainly explained in the description below.

The load 65 is the motor generator capable of both powering and regeneration. The power source 85 is a main battery (energy storage element) for supplying electric power in response to the required power of the load 65. The power source 55 is an auxiliary battery (energy storage element) to be used in place of the power source 85 for supplying electric power in response to the required power of the load 65. The capacitor 52 is the energy storage element for storing the voltage stepped up by the primary conversion circuit 20, and constructed as the electric double layer capacitor whose output characteristics are superior to those of the power sources 85 and 55.

The power conversion mode determination processing section 502e determines that the primary conversion circuit 20 is operated, in normal times, so as to step up the voltage input to the second input/output port 290 from the power source 55 and output the stepped-up voltage to the first input/output port 280 for charging the capacitor 52. Further, the power conversion mode determination processing section 502e also determines that the secondary conversion circuit 30 is operated, in normal times, so as to step up the voltage input to the fourth input/output port 390 from the power source 85 for supplying electric power to the load 65 with the stepped-up voltage. In other words, the power conversion mode determination processing section 502e determines the mode D as the operation mode of the primary conversion circuit 20 and the mode L as the operation mode of the secondary conversion circuit 30 to operate the power conversion circuit 10 with respect to the stationary power component in the required power of the load 65. When detecting the transient power component in the required power based on the information obtained from the monitor for monitoring the voltage of the power source 85 or other components, the power conversion mode determination processing section 502e determines that power transmission is performed in such a manner that the capacitor 52 in the primary conversion circuit 20 can supply electric power to the load 65 in response to the transient power component in the required power. In other words, the power conversion mode determination processing section 502c causes, with respect to the stationary power component in the required power of the load 65, the power conversion circuit 10 to be operated with the mode D (for the primary conversion circuit 20) and with the mode L (for the secondary conversion circuit 20) in order to supply electric power from the power source 85 to the load 65. Meanwhile, with respect to the transient power component in the required power of the load 65, the power conversion mode determination processing section 502e changes the mode to the mode B (for both of the primary and secondary conversion circuits 20 and 30) and causes the power conversion circuit 10 to supply electric power from the capacitor 52 to the load 65.

Operation of the thus-configured power conversion circuit system 105 will be described with reference to FIG. 7. In the power conversion circuit system 105, the power conversion circuit 10 is operated with the modes D and L to perform power supply using only the power source 85 for the stationary power component in the required power of the load 65. Therefore, the power conversion mode determination processing section 502e determines the modes D and L as the operation mode in the primary conversion circuit 20. Then, because electric power is not transmitted between the primary conversion circuit 20 and the secondary conversion circuit 30, the phase difference φ determination processing section 504 determines that the phase difference φ is 0. Meanwhile, the ON time δ determination processing section 506 determines the ON time δ suitable for allowing the primary and secondary conversion circuits 20 and 30 to step up the voltage at the predetermined step up ratio. The primary switching processing section 508 and the secondary switching processing section 510 respectively control switching in such a manner that the primary and secondary conversion circuits 20 and 30 function as the step-up circuit for the ON time δ. In this way, with respect to the stationary power component in the required power of the load 65, electric power can be supplied only from the power source 85 while stepping up the voltage input from the power source 55 to the second input/output port 290 to charge the capacitor 52 with the stepped-up voltage.

After that, when the voltage state of the power source 85 falls outside the predetermined range due to voltage drop of the power source 60, a power component is determined to be the transient power component in the required power of the load 65, thereby causing the power conversion circuit 10 to be operated with the operation mode of the mode B in order to use the capacitor 52 in place of the power source 85 for supplying electric power to the load 65. To achieve this, the power conversion mode determination processing section 502e changes the operation mode from the modes D and L to the mode B. At this time, the phase difference φ determination processing section 504 and the ON time δ determination processing section 506 respectively determine the phase difference φ and the ON time δ suitable for allowing transmission of electric power between the primary conversion circuit 20 and the secondary conversion circuit 30. Then, the primary switching processing section 508 and the secondary switching processing section 510 respectively control switching of each switching element in the primary and secondary conversion circuits 20 and 30 based on the determined phase difference φ and ON time δ. In this way, the power source 85 can be used for supplying electric power to the load 65 in the presence of the stationary power component in the required power of the load 65, whereas the capacitor 52 can be used for supplying electric power to the load 65 in the presence of the transient power component in the required power of the load 65.

Figure 8:
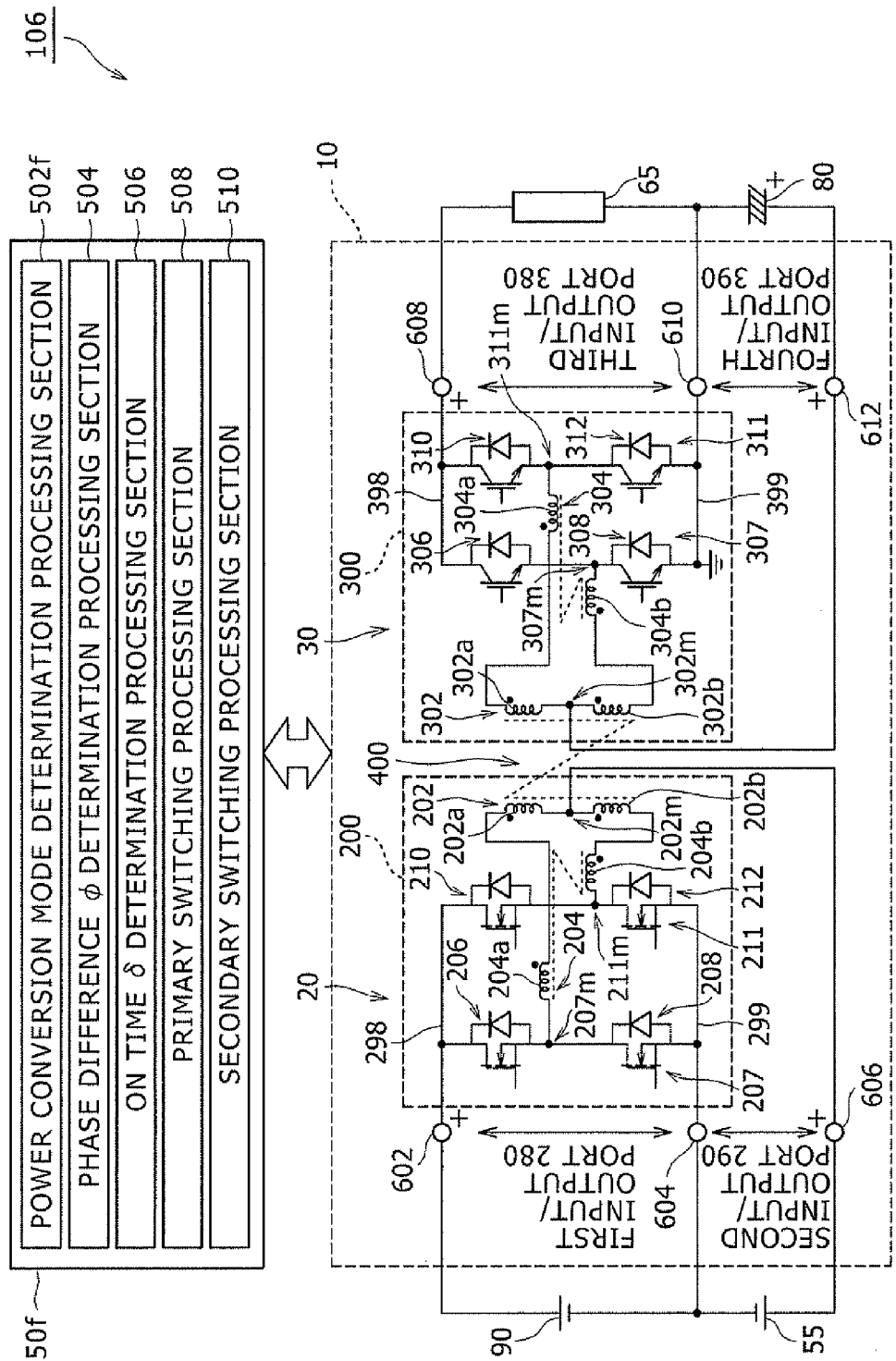
FIG. 8 shows a sixth example of the power conversion circuit system in the embodiment of the present invention.

Next, a power conversion circuit system 106 containing a load or the like connected to the power conversion circuit 10 will be described below. FIG. 8 shows the power conversion circuit system 106. The power conversion circuit system 106 comprises the power conversion circuit 10, a control circuit 50f, a power source 90 connected to the first input/output port 280, the power source 55 connected to the second input/output port 290, the load 65 connected to the third input/ output port 380, and a capacitor 80 connected to the fourth input/output port 390. The difference between the power conversion circuit system 106 and the power conversion circuit system 100 lies in the power sources 55 and 90, the capacitor 80, and the load 65 contained in the power conversion circuit system 106, and in a function of a power conversion mode determination processing section 502f in the control circuit 50f, which will be mainly explained in the description below.

The load 65 is the motor generator capable of powering and regeneration. The power source 90 is a capacitive battery (energy storage element) which outputs a voltage of 50 V, and used for supplying electric power in the presence of the stationary power component in the required power of the load 65. The power source 55 is a capacitive battery (energy storage element) which outputs a voltage of 12 V. The capacitor 80 is an electric double layer capacitor whose breakdown voltage is 300 V, and used as an energy storage element for accumulating electric power transmitted from the primary conversion circuit 20. In addition, the electric double layer capacitor used as the capacitor 80 has output characteristics superior to those of the power sources 90 and 55.

The power conversion mode determination processing section 502f determines that, in normal times, the voltage input from the power source 55 to the second input/output port 290 is stepped up and output to the first input/output port 280 for charging the power source 90 with the stepped-up voltage in the primary conversion circuit 20, while the electric power of the power source 90 is transmitted to the secondary conversion circuit 30 and supplied to the load 65. In other words, the power conversion mode determination processing section 502f operates the power conversion circuit 10 with the mode F with respect to the stationary power component in the required power of the load 65. When detecting, based on the information from the monitor for monitoring the voltage of the power source 90 or other components, the transient power component in the required power of the load 65, the power conversion mode determination processing section 502f determines that power transmission is performed in such a manner that electric power can be supplied from the capacitor 80 to the load 65 with respect to the transient power in the required power. In other words, with respect to the stationary power component in the required power of the load 65, the power conversion mode determination processing section 502f operates the power conversion circuit 10 with the mode F in order to supply electric power from the power source 90 to the load 65. On the other hand, with respect to the transient power component in the required power of the load 65, the power conversion mode determination processing section 502f changes the mode to the mode L and causes the power conversion circuit 10 to supply electric power from the capacitor 80 to the load 65.

Operation of the thus-configured power conversion circuit system 106 will be described with reference to FIG. 8. In the power conversion circuit system 106, the power conversion circuit 10 is operated with the mode F to supply electric power using only the power source 90 charged by the power source 55 in the presence of the stationary power component in the required power of the load 65. Therefore, the power conversion mode determination processing section 502f determines the mode F as the operation mode. At this time, the phase difference φ determination processing section 504 and the ON time δ determination processing section 506 respectively determine the phase difference φ and the ON time δ which are adequate for allowing the primary conversion circuit 20 to function as the step-up circuit, allowing the primary and secondary conversion circuits 20 and 30 to transmit electric power to each other, and allowing the secondary conversion circuit 30 to function as the step-down circuit. The primary and secondary switching processing sections 508 and 510 control switching based on the phase difference φ and the ON time δ. In this way, power supply can be performed using only the power source 90 charged by the power source 55 with respect to the stationary power component in the required power of the load 65.

Then, when the voltage state of the power source 90 falls outside the predetermined range due to voltage drop of the power source 90, the required power of the load 65 is determined to be the transient power component, thereby causing the power conversion circuit 10 to be operated with the operation mode of the mode L in which the capacitor 80 is used in place of the power source 90 for supplying electric power to the load 65. To achieve this, the power conversion mode determination processing section 502f changes the operation mode from the mode F to the mode L. At this time, the phase difference determination processing section 504 determines the phase difference φ as 0 to prevent the primary and secondary conversion circuits 20 and 30 from transmitting electric power to each other. Meanwhile, the ON time δ determination processing section determines the ON time δ suitable for allowing the secondary conversion circuit 30 to function as the step-up circuit. Then, the secondary switching processing section 510 controls switching of each switching element in the secondary conversion circuit 30 based on the determined ON time δ. In this way, the power source 90 can be used for supplying electric power to the load 65 in the presence of the stationary power component in the required power of the load 65, whereas the capacitor 80 can be used for supplying electric power to the load 65 in the presence of the transient power component in the required power of the load 65.

Figure 9:
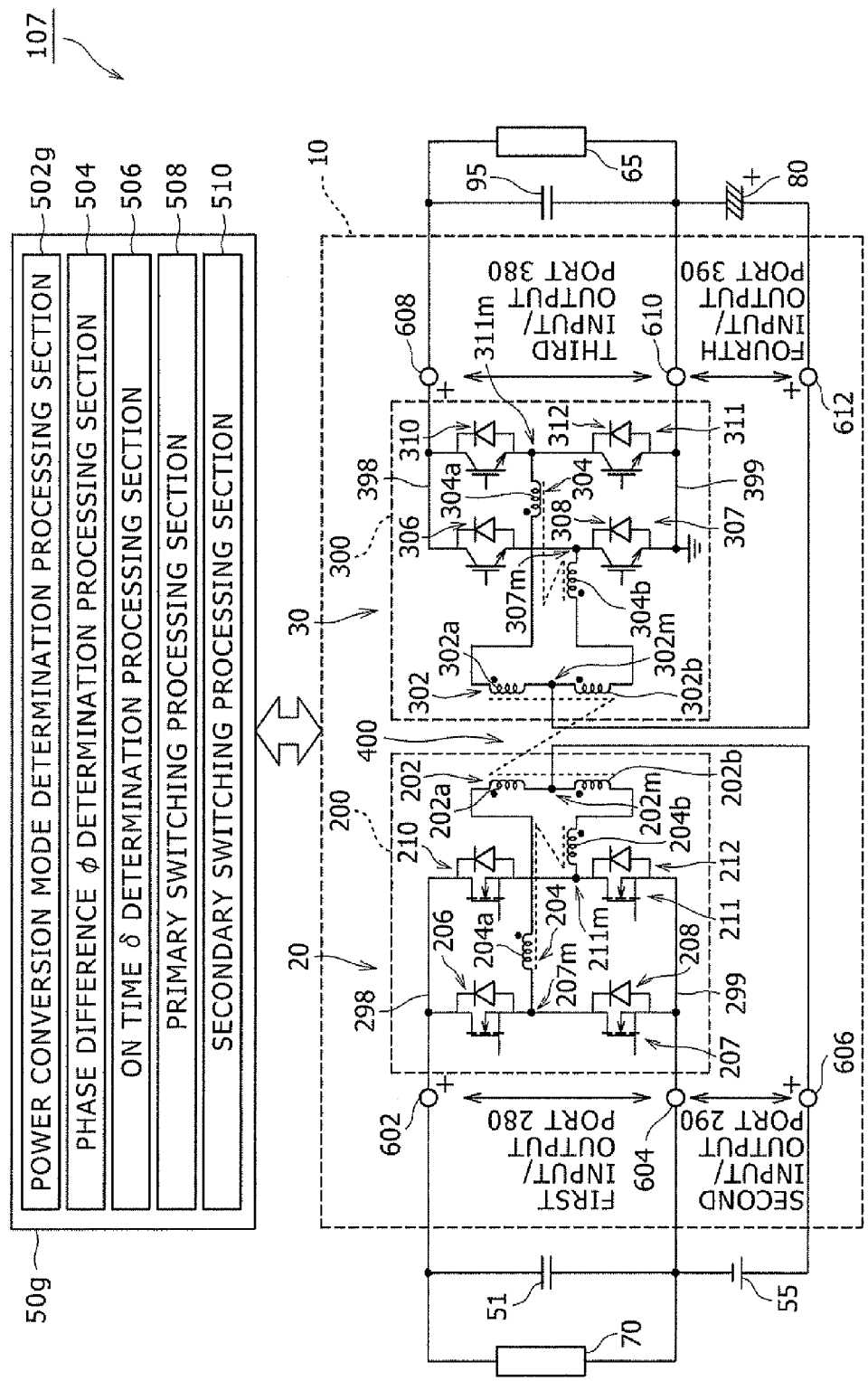
FIG. 9 shows a seventh example of the power conversion circuit system in the embodiment of the present invention.

Next, a power conversion circuit system 107 containing a load or the like connected to the power conversion circuit 10 will be described below. FIG. 9 shows the power conversion circuit system 107. The power conversion circuit system 107 comprises the power conversion circuit 10, a control circuit 50g, a load 70 connected to the first input/output port 280, the capacitor 51 connected to the first input/output port 280 in parallel with the load 70, the power source 55 connected to the second input/output port 290, the load 65 connected to the third input/output port 380, a capacitor 95 connected to the third input/output port 380 in parallel with the load 65, and the capacitor 80 connected to the fourth input/output port 390. The difference between the power conversion circuit system 107 and the power conversion circuit system 100 lies in the load 70, the capacitor 51, the power source 55, the load 65, and the capacitors 95 and 80 contained in the power conversion circuit system 106, and in a function of a power conversion mode determination processing section 502g in the control circuit 50g, which will be mainly explained in the description below.

The load 65 is a motor generator capable of powering and regeneration. The capacitor 95 is an energy storage element connected in parallel to the load 65. The capacitor 80 is an electric double layer capacitor having output characteristics superior to those of the power source 55 and constructed as a high-capacity capacitor (energy storage element) whose breakdown voltage is 300 V. The load 70 is a load element whose required voltage is 100 V. The capacitor 51 is an energy storage element connected in parallel to the load 70. The power source 55 is a capacitive battery (energy storage element) which outputs a voltage of 50 V.

The power conversion mode determination processing section 502g determines that, in normal times, the voltage input to the second input/output port 290 from the power source 55 is stepped up, then output to the first input/output port 280, and supplied via the capacitor 51 to the load 70 in the primary conversion circuit 20, while electric power stored in the capacitor 51 is transmitted to the secondary power conversion circuit 30 and supplied to the load 65. In other words, the power conversion mode determination processing section 502g operates the power conversion circuit 10 with the mode F with respect to the stationary power component in the required power of the load 65. When detecting, based on the information from the monitor for monitoring the voltage of the power source 55, the transient power component in the required power of the load 65, the power conversion mode determination processing section 502g determines that power transmission is performed with respect to the transient power component in the required power in such a manner that the capacitor 80 can supply electric power to the load 65. In other words, the power conversion mode determination processing section 502g cause the power conversion circuit 10 to be operated with the mode F with respect to the stationary power component in the required power of the load 65, thereby supplying electric power from the power source 55 to the load 65. On the other hand, with respect to the transient power component in the required power of the load 65, the power conversion mode determination processing section 502g changes the mode of the power conversion circuit 10 to the mode L for supplying electric power from the capacitor 80 to the load 65.

Operation of the thus-configured power conversion circuit system 107 will be described with reference to FIG. 9. In the power conversion circuit system 107, the power conversion circuit 10 is operated with the mode F to perform power supply using only the power source 55 in the presence of the stationary power component in the required power of the load 65. Therefore, the power conversion mode determination processing section 502g determines the mode F as the operation mode. At this time, the phase difference 9 determination processing section 504 and the ON time δ determination processing section 506 respectively determine the phase difference φ and the ON time δ which are adequate for allowing the primary conversion circuit 20 to function as the step-up circuit, allowing the primary and secondary conversion circuits 20 and 30 to transmit electric power to each other, and allowing the secondary conversion circuit 30 to function as the step-down circuit. The primary and secondary switching processing sections 508 and 510 control switching based on the determined phase difference φ and the determined ON time δ.

Thereafter, when the voltage state of the power source 55 falls outside the predetermined range due to voltage drop of the power source 55, the required power of the load 65 is determined to be the transient power component, thereby causing the power conversion circuit 10 to be operated with the operation mode of the mode L in order to use the capacitor 80 in place of the power source 55 for supplying electric power to the load 65. To achieve this, the power conversion mode determination processing section 502g changes the mode F to the mode L. At this time, the phase difference φ determination processing section 504 determines the phase difference φ as 0 to prevent the primary and secondary conversion circuits 20 and 30 from mutually transmitting electric power. Meanwhile, the ON time δ determination processing section 506 determines the ON time δ suitable for allowing the secondary conversion circuit 30 to function as the step-up circuit. After that, the secondary switching processing section 510 controls switching of each switching element in the secondary conversion circuit 30 based on the determined ON time δ. In this way, the power source 55 can be used for supplying electric power to the load 65 in the presence of the stationary power component in the required power of the load 65, whereas the capacitor 80 can be used for supplying electric power to the load 65 in the presence of the transient power component in the required power of the load 65.

Figure 10:
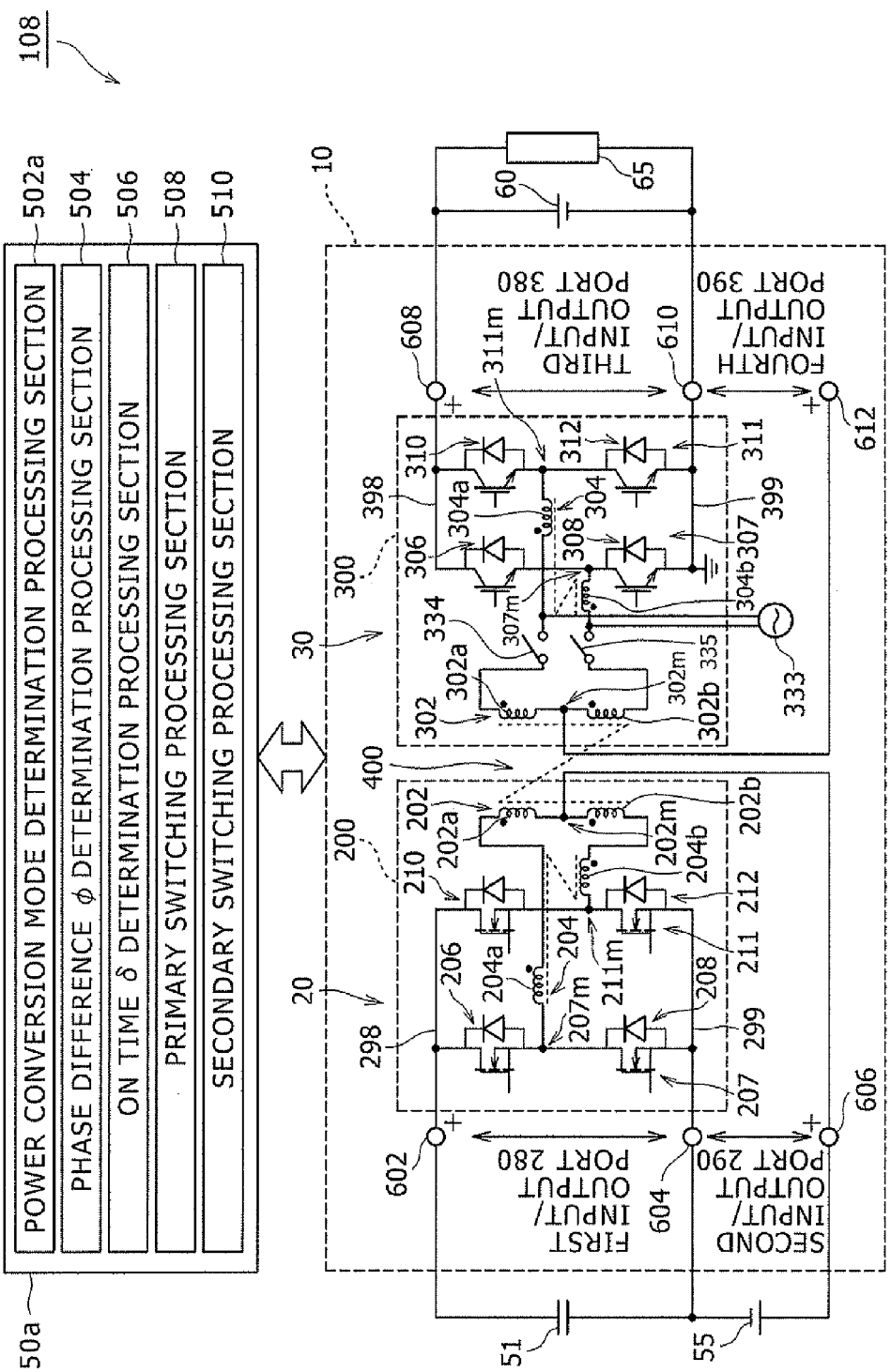
FIG. 10 shows an eighth example of the power conversion circuit system in the embodiment of the present invention.

Next, a power conversion circuit system 108 including a load or the like connected to the power conversion circuit 10 will be described below. FIG. 10 shows the power conversion circuit system 108. In addition to having the configuration of the power conversion circuit system 101, the power conversion circuit system 108 further includes an AC source 333 and relays 334, 335 at the midpoint of the secondary magnetic coupling reactor 304. In the description below, the difference between the power conversion circuit system 108 and the power conversion circuit system 101; i.e., the AC source 333 and the relays 334, 335 provided at the midpoint of the secondary magnetic coupling reactor 304, will be mainly explained.

The AC source 333 is inserted between a connection line for connecting one end of the secondary magnetic coupling reactor 304a to one end of the secondary coil 302a and a connection line for connecting one end of the secondary coil 302b to one end of the secondary magnetic coupling reactor 304b.

The relay 334 is disposed on the connection line for connecting the one end of the secondary magnetic coupling reactor 304a to the one end of the secondary coil 302a. The relay 335 is disposed on the connection line for connecting the one end of the secondary coil 302b to the one end of the secondary magnetic coupling reactor 304b.

Operation of the thus-configured power conversion circuit system 108 will be described with reference to FIG. 10. In the power conversion system 108, because the AC source 333 is provided at the midpoint of the secondary magnetic coupling reactor 304, a voltage input from the AC source 333 can be stepped up through the step-up function of the secondary conversion circuit 30 and the load 65 can be charged with the stepped-up voltage. In addition, while the load 65 is being charged using the AC source 333, the secondary coil 302 and the secondary magnetic coupling reactor 304 can be electrically isolated from each other by turning off the relays 334 and 335, to prevent influence to the transformer 400. Here, providing the AC source 333 and the relays 334, 335 at the midpoint of the secondary magnetic coupling reactor 304 in the power conversion circuit system 108 is described above. However, when the load 65 is connected to the first input/output port 280 or the second input/output port 290 in the primary conversion circuit 20, the AC source 333 and the relays 334, 335 may be provided at the midpoint of the primary magnetic coupling reactor 204, to thereby charge the load 65 using the AC source 333.

Figure 11:
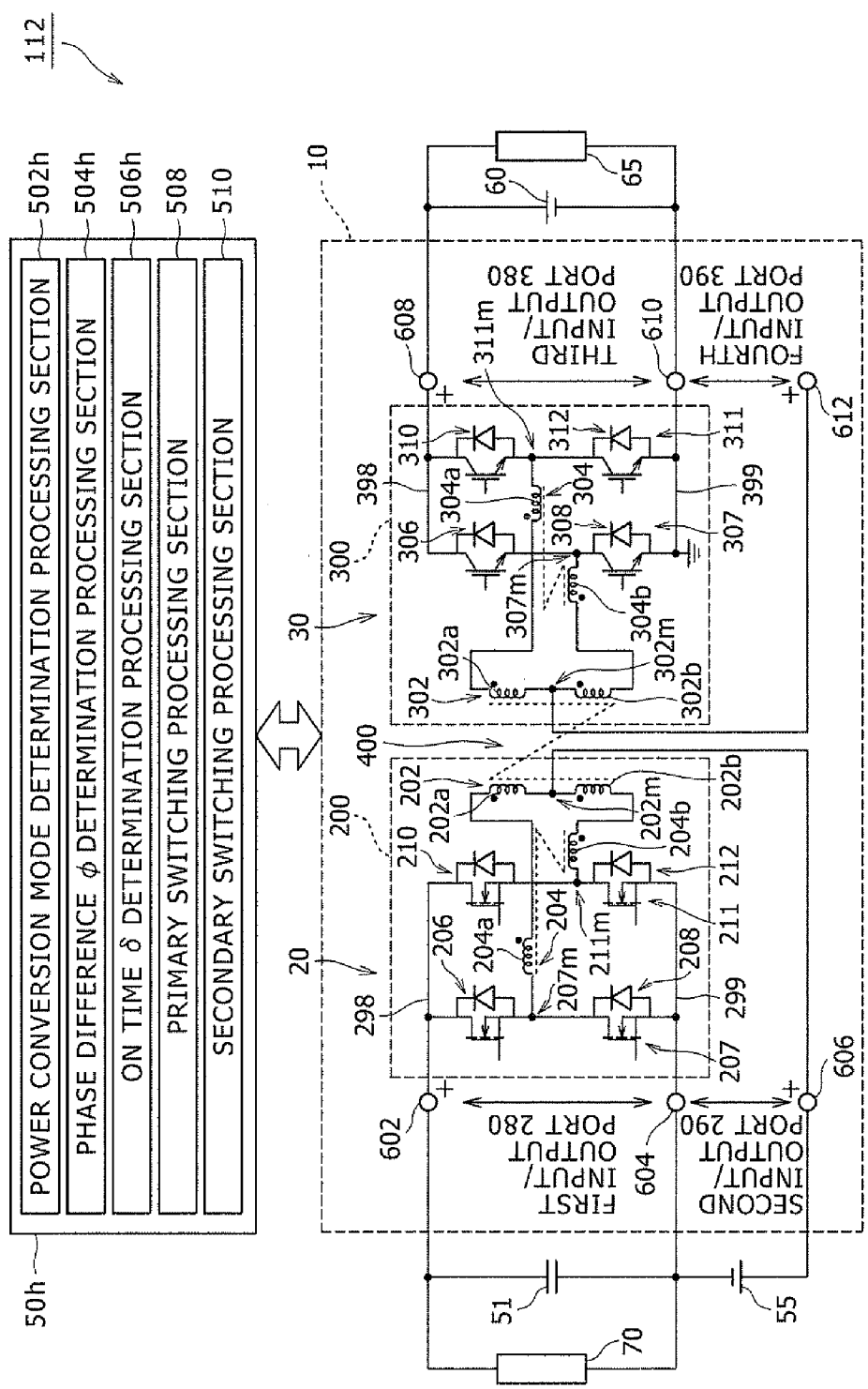
FIG. 11 shows a first modification example of the power conversion circuit system according to the second example in the embodiment of the present invention.
Figure 12:
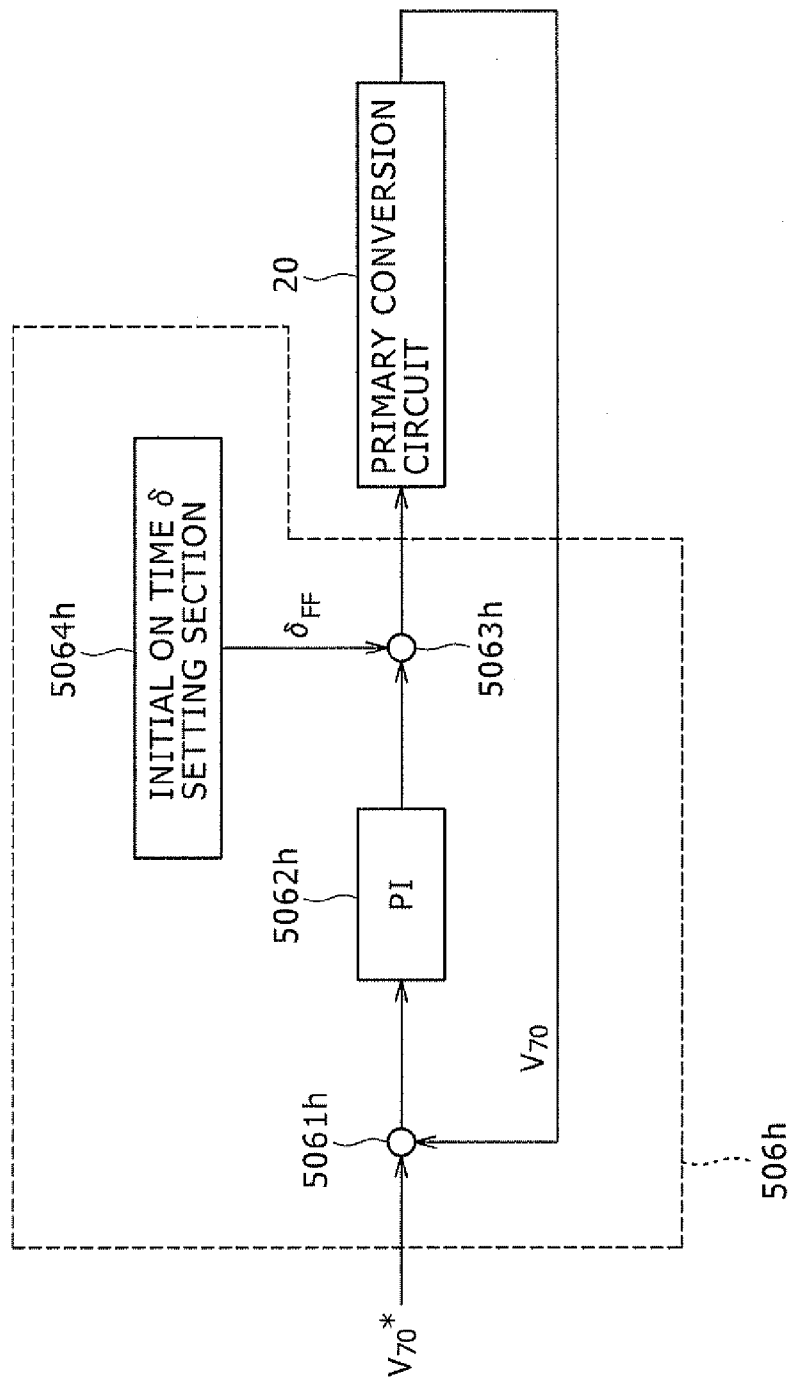
FIG. 12 is a schematic diagram showing a specific configuration of an ON time δ determination processing section in the first modification example of the power conversion circuit system according to the second example in the embodiment of the present invention.
Figure 13:
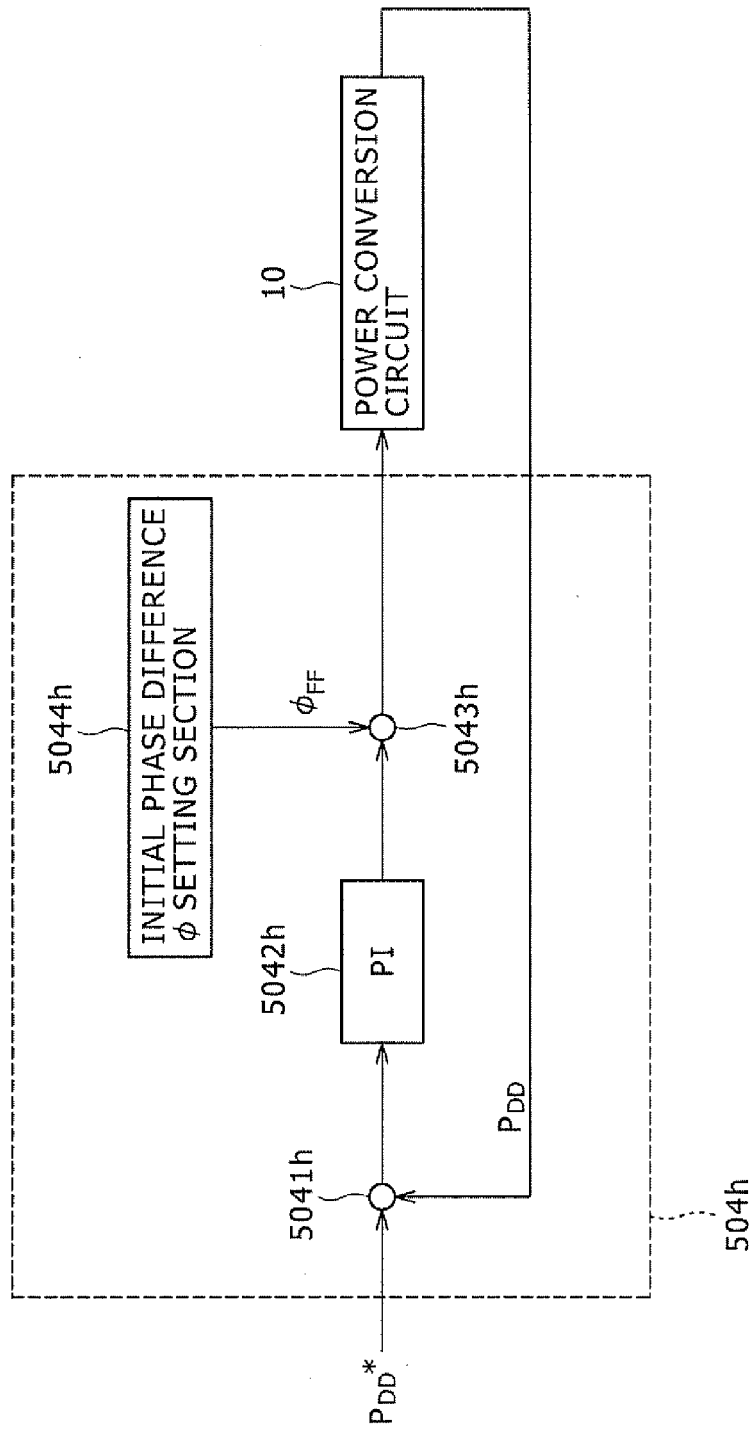
FIG. 13 is a schematic diagram showing a specific configuration of a phase difference φ determination processing section in the first modification example of the power conversion circuit system according to the second example in the embodiment of the present invention.

Next, a power conversion circuit system 112 which is a first modification example of the power conversion circuit system 102 will be described. FIG. 11 shows the power conversion circuit system 112. In the following description, it is assumed that electric power which is stepped up from output power of the power source 55 by the primary conversion circuit 20 is supplied to the load 70, while at the same time the output power of the power source 55 is transmitted via the primary and secondary conversion circuits 20 and 30 to the load 65 in the power conversion circuit system 112. To achieve this, the power conversion circuit system 112 should be operated with the operation modes of D and E. The difference between the power conversion circuit system 112 and the power conversion circuit system 102 lies in an ON time δ determination processing section 506h and a phase difference φ determination processing section 504h, which will be described below. Here, specific configurations of the ON time δ determination processing section 506h and the phase difference φ determination processing section 504h favorable for determining the ON time δ and the phase difference φ by means of feedback control in a control circuit 50h of the power conversion circuit system 112 will be described with reference to FIGS. 12 and 13. FIG. 12 is a schematic diagram showing the specific configuration of the ON time δ determination processing section 506h. FIG. 13 is a schematic diagram showing the specific configuration of the phase difference 9 determination processing section 504h.

The ON time δ determination processing section 506h comprises an adding part 5061h, a PI computing part 5062h, an adding part 5063h, and an initial ON time δ setting section 5064h. The ON time δ determination processing section 506h has a function of determining the ON time δ, which will be a basis of the step-up ratio (the step up duty ratio) of the primary conversion circuit 20, in light of feedback on a voltage ($V_{70}$) across the load 70 to ensure that the voltage ($V_{70}$) across the load is set to a predetermined command voltage ($V^*_{70}$). The initial ON timed setting section 5064h previously establishes, as an initial value, an ON time $δ_{FF}$ in such a manner that the output voltage of the power source 55 is stepped up to the predetermined command voltage ($V^*_{70}$) by the primary conversion circuit 20. The adding part 5061h has a function of computing the command voltage ($V^*_{70}$) to be input and the voltage stepped up by the primary conversion circuit 20, (the voltage ($V_{70}$) across the load 70) to be input through feedback, and outputting a resulting value to the PI computing part 5062h. The PI computing part 5062h has a function of multiplying the value input from the adding part 5061h by a PI gain to obtain a reference value for ON time δ adjustment and inputting the reference value for ON time δ adjustment to the adding part 5063h. The adding part 5063h computes the previously established ON time $δ_{FF}$ and the reference value for ON time δ adjustment input from the PI computing part 5062h to find a new ON time δ.

The phase difference φ determination processing section 504h comprises an adding part 5041h, a PI computing part 5042h, an adding part 5043h, and an initial phase difference φ setting section 5044h. The phase difference φ determination processing section 504h has a function of determining a phase difference φ between the primary conversion circuit 20 and the secondary conversion circuit 30 in light of feedback on transmission power ($P_{DD}$) from the power source 55 to the load 65 to ensure that the transmission power ($P_{DD}$) from the power source 55 to the load 65 is equal to a predetermined command transmission power ($P^*_{DD}$). The initial phase difference φ setting section 5044h defines, as the command transmission power ($P^*_{DD}$), electric power which can be supplied from the power source 55 to the load 65 while performing power supply from the power source 55 to the load 70, and previously establishes a phase difference $φ_{FF}$ adequate to transmit the specified command transmission power ($P^*_{DD}$) from the power source 55 to load 65. The adding part 5041h has a function of computing the command transmission power ($P^*_{DD}$) and the transmission power ($P_{DD}$) to be input through the feedback, and inputting a resulting value to the PI computing part 5042h. The PI computing part 5042h has a function of multiplying the value input from the adding part 5041h by the PI gain to obtain a reference value for phase difference φ adjustment, and inputting the obtained reference value for phase difference φ adjustment to the adding part 5043h. The adding part 5043h computes the previously established phase difference $φ_{FF}$ and the reference value for phase difference φ adjustment input from the PI computing part 5042h to obtain a new phase difference φ.

An example of operating the thus-configured power conversion circuit system 112 with the operation mode D or E will be described. Here, in the power conversion mode determination processing section 502h, the operation mode D is determined in order to supply electric power from the power source 55 to the load 70, while the operation mode E is determined in order to supply electric power from the power source 55 to the load 65. Note that which of the operation modes D and E is used for operation may be selected based on the information from the monitor for monitoring the voltage of the power source 55, the load 70, and other components. Then, the ON time δ determination processing section 506h determines the ON time $δ_{FF}$ suitable for causing the primary conversion circuit 20 to step up the output voltage of the power source 55 to the predetermined command voltage ($V^*_{70}$). Further, the ON time δ determination processing section 506h changes the ON time δ in light of feedback on an actual voltage ($V_{70}$) across the load 70 to ensure that the actual voltage ($V_{70}$) is maintained at the predetermined command voltage ($V^*_{70}$).

The phase difference determination processing section 504h defines, as the command transmission power ($P^*_{DD}$), electric power which can be supplied from the power source 55 to the load 65 while performing the power supply from the power source 55 to the load 70, and determines the phase difference φ adequate to transmit the command transmission power ($P^*_{DD}$) from the power source 55 to the load 65. Further, the phase difference φ determination processing section 504h changes the phase difference φ based on feedback in relation to actual transmission power ($P_{DD}$) to ensure that the actual transmission power ($P_{DD}$) is maintained equal to the command transmission power ($P^*_{DD}$).

Based on the phase difference φ and the ON time δ determined by the phase difference φ determination processing section 504h and the ON time δ determination processing section 506h as described above, the primary switching processing section 508 and the secondary switching processing section 510 control switching of the switching elements in the primary conversion circuit 20 and the secondary conversion circuit 30, respectively. More specifically, the primary switching processing section 508 controls switching of each of the switching elements in the primary left upper arm 206, the primary left lower arm 208, the primary right upper arm 210, and the primary right lower arm 212 in such a manner that the primary conversion circuit 20 is caused to function as the step up circuit when the operation mode D is established, whereas the primary conversion circuit 20 is caused to function as the step-up circuit and also function as a part of the DC-DC converter circuit when the operation mode E is established.

The secondary switching processing section 510 controls switching of each of the switching elements in the secondary left upper arm 306, the secondary left lower arm 308, the secondary right upper arm 310, and the secondary right lower arm 312 in such a manner that the secondary conversion circuit 30 is caused to function as a part of the DC-DC converter circuit when the operation mode E is established.

When the power conversion circuit system 112 is operated with the operation modes D, E as described above, while the output power of the power source 55 is stepped up and the stepped-up output power is supplied to the load 70, the output power of the power source 55 can be also transmitted to the load 65. Thus, electric power allocated to the power source 60 for supplying the load 65 can be covered by electric power transmitted from the power source 55 to the load 65.

Figure 14:
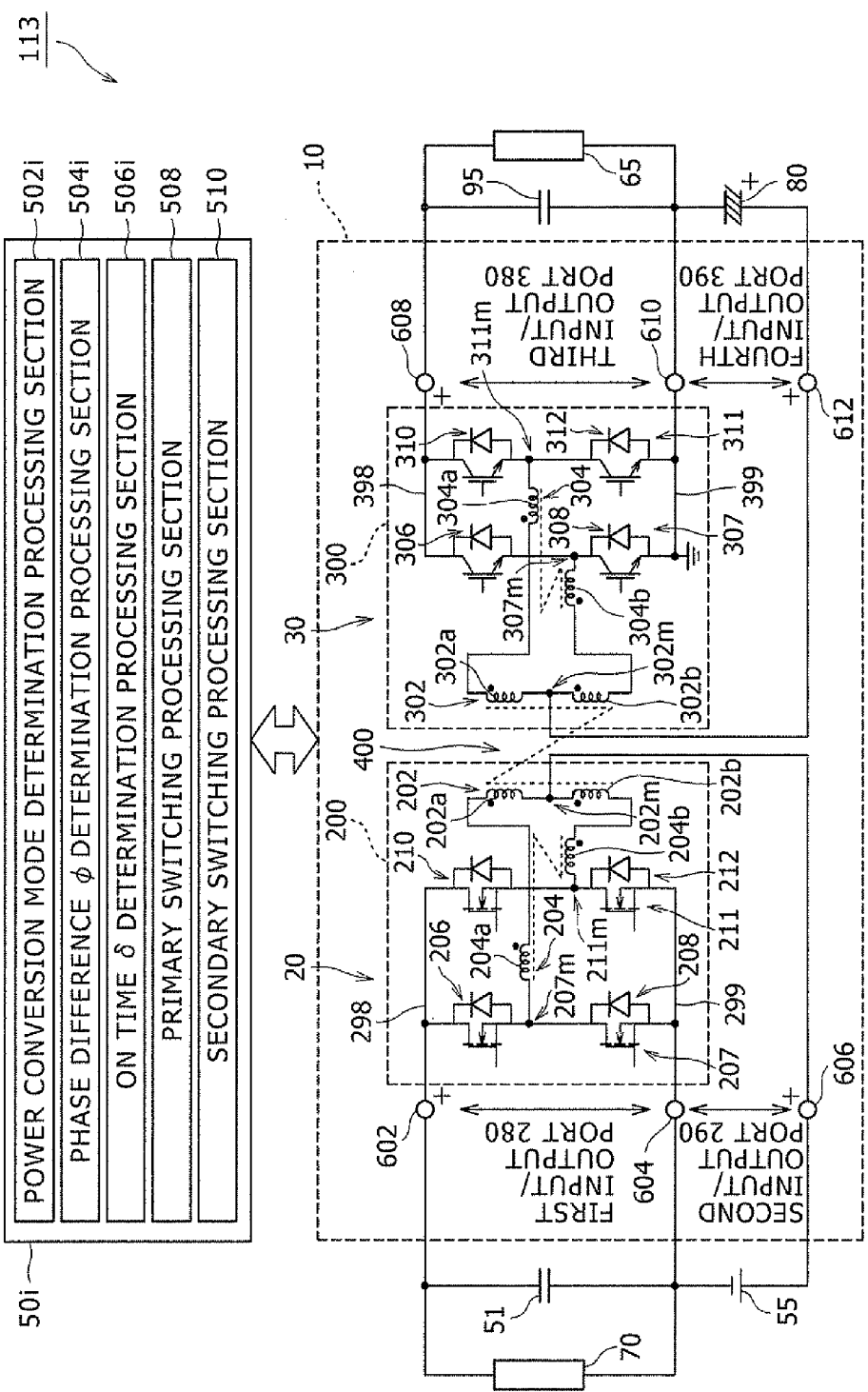
FIG. 14 shows a first modification example of the power conversion circuit system according to the seventh example in the embodiment of the present invention.
Figure 15:
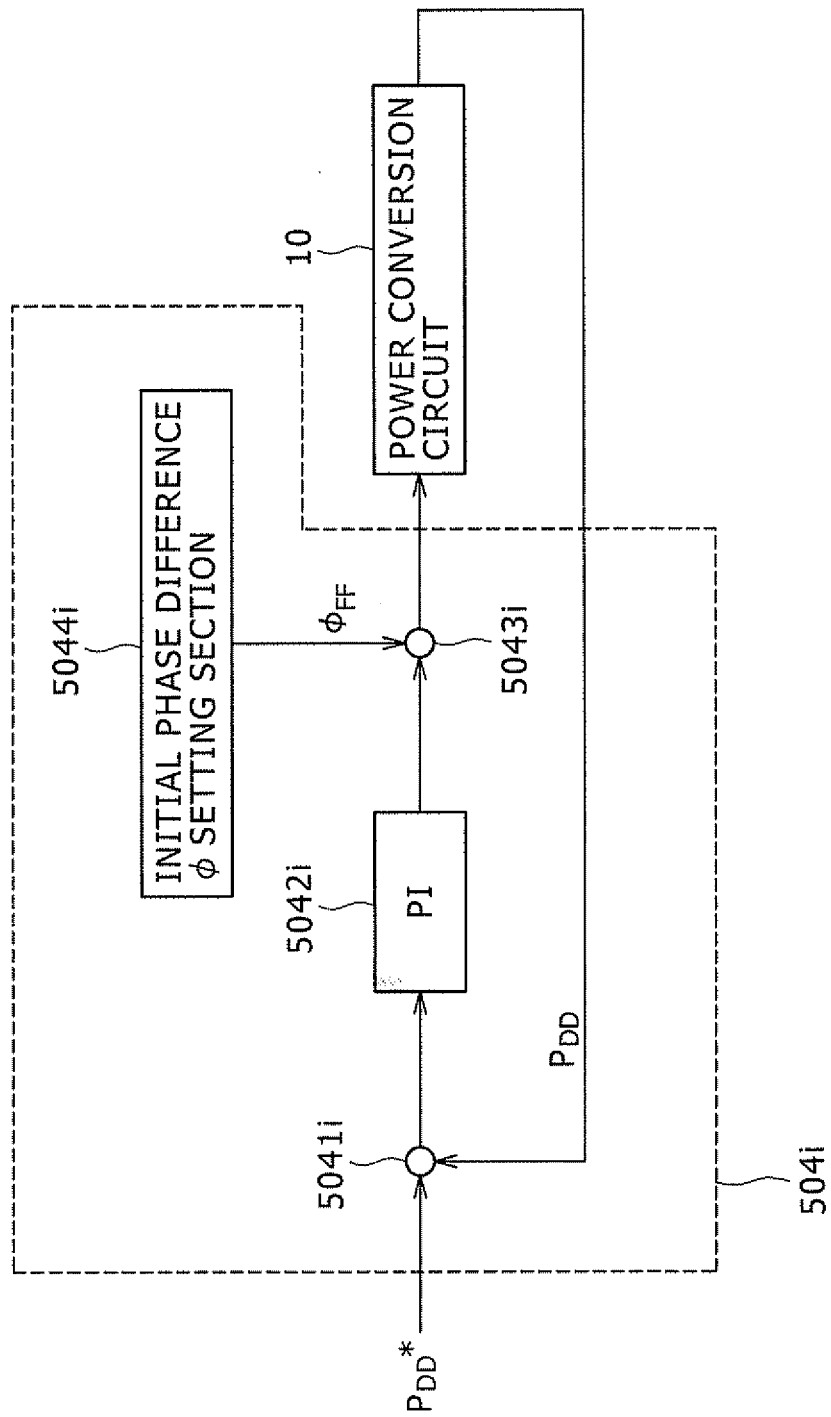
FIG. 15 is a schematic diagram showing a specific configuration of the phase difference φ determination processing section in the first modification example of the power conversion circuit system according to the seventh example in the embodiment of the present invention.
Figure 16:
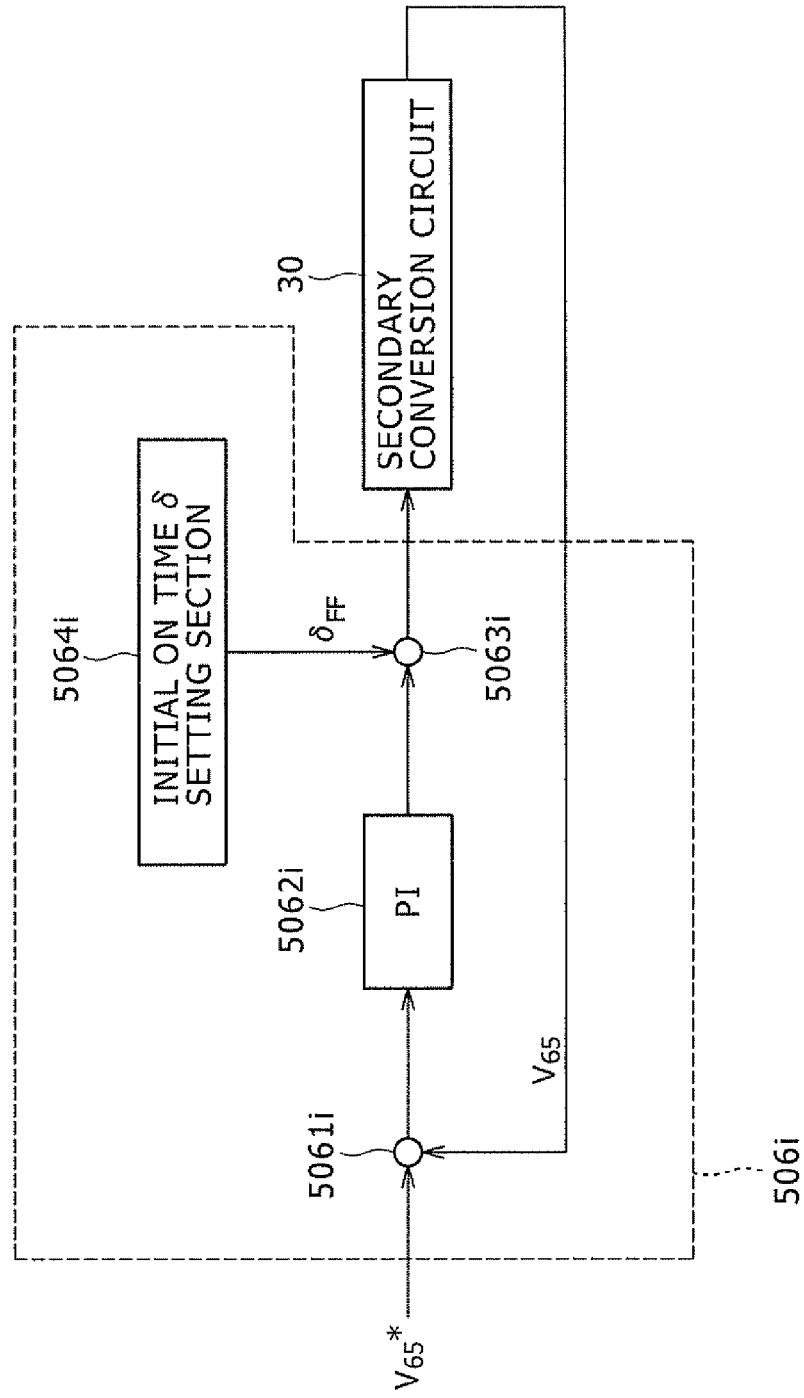
FIG. 16 is a schematic diagram showing a specific configuration of the ON time δ determination processing section in the first modification example of the power conversion circuit system according to the seventh example in the embodiment of the present invention.

Next, a power conversion circuit system 113 which is a first modification example of the power conversion circuit system 107 will be described. FIG. 14 shows the power conversion circuit system 113. In the following description, it is assumed that output power of the power source 55 is transmitted and supplied via the primary and secondary conversion circuits 20 and 30 to the load 65, while compensating for a deficiency of a power supply from the power source 55 to the load 65 in the power conversion circuit system 113. To achieve this, the power conversion circuit system 113 should be operated with the operation mode E. Here, the difference between the power conversion circuit system 113 and the power conversion circuit system 107 lies in an ON time δ determination processing section 506i and a phase difference φ determination processing section 504i, which will be described below. In this example, specific configurations of the ON time δ determination processing section 506i and the phase difference φ determination processing section 504i favorable for determining the ON time δ and the phase difference φ by means of feedback control in a control circuit 50i of the power conversion circuit system 113 are described with reference to FIGS. 15 and 16. FIG. 15 is a schematic diagram showing the specific configuration of the phase difference φ determination processing section 504i. FIG. 16 is a schematic diagram showing the specific configuration of the ON time δ determination processing section 506i.

The phase difference determination processing section 504i comprises an adding part 5041i, a PI computing part 5042i, an adding part 5043i, and an initial phase difference φ setting section 5044i. The phase difference φ determination processing section 504i has a function of determining the phase difference φ between the primary and secondary conversion circuits 20 and 30 in light of feedback on transmission power ($P_{DD}$) from the power source 55 to the load 65 in such a manner that the transmission power ($P_{DD}$) from the power source 55 to the load 65 is set to predetermined command transmission power ($P^*_{DD}$). The initial phase difference φ setting section 5044i defines, as the command transmission power ($P^*_{DD}$), electric power which can be transmitted from the power source 55 to the load 65, and previously establishes the phase difference $\phi_{FF}$ adequate to transmit the command transmission power ($P^*_{DD}$) from the power source 55 to load 65. The adding part 5041i has a function of computing the command transmission power ($P^*_{DD}$) and the transmission power ($P_{DD}$) to be input through the feedback, and inputting a resulting value to the PI computing part 5042i. The PI computing part 5042i has a function of multiplying the value input from the adding part 5041i by the PI gain to obtain a reference value for phase difference φ adjustment, and inputting the obtained reference value for phase difference φ adjustment to the adding part 5043i. The adding part 5043i computes the previously established phase difference $\phi_{FF}$ and the reference value for phase difference φ adjustment input from the PI computing part 5042i to obtain a new phase difference φ.

The ON time δ determination processing section 506i comprises an adding part 5061i, a PI computing part 5062i, an adding part 5063i and an initial ON time δ setting section 5064i. The ON time δ determination processing section 506i has a function of determining the ON time δ, which will be the basis of the step-up ratio (the step up duty ratio) in the secondary conversion circuit 30, in light of feedback on a voltage ($V_{65}$) across the load 65 in such a manner that the voltage ($V_{65}$) across the load 65 is set to a predetermined command voltage ($V^*_{65}$). The initial ON time δ setting section 5064i defines, as the command voltage ($V^*_{65}$), a voltage corresponding to differential power obtained by subtracting, from the required power of the load 65, the transmission power ($P_{DD}$), which is transmitted from the power source 55 to the load 65, and previously establishes, as the initial value, the ON time $\delta_{FF}$ in such a manner that the output voltage of the capacitor 80 is stepped up by the secondary conversion circuit 30 to the predetermined command voltage ($V^*_{65}$) and supplied to the load 65. The adding part 5061i has a function of computing the command voltage ($V^*_{65}$) to be input and the voltage stepped up by the secondary conversion circuit 20 (the voltage ($V_{65}$) across the load 65) to be input through feedback, and outputting a resulting value to the PI computing part 5062i. The PI computing part 5062i has a function of multiplying the value input from the adding part 5061i by the PI gain to obtain a reference value for ON time δ adjustment and inputting the reference value for ON time δ adjustment to the adding part 5063i. The adding part 5063i computes the previously established ON time $\delta_{FF}$ and the reference value for ON time δ adjustment reference value input from the PI computing part 5062i to obtain a new ON time δ.

An example of operating the thus-configured power conversion circuit system 113 with the operation mode E or I will be described. Here, in the power conversion mode determination processing section 502i, the operation mode D is determined to supply electric power from the power source 55 to the load 65, while the operation mode I is determined to supply electric power from the capacitor 80 to the load 65. Note that which of the operation modes E and I is used for operation may be selected based on the information from the monitor for monitoring the voltage of the power source 55 and other components. Then, the phase difference 9 determination processing section 504i defines, as the command transmission power ($P^*_{DD}$) electric power which can be supplied from the power source 55 to the load 65, and determines the phase difference $\phi_{FF}$ between the primary and secondary conversion circuit 20 and 30 in such a manner that transmission power ($P_{DD}$) from the power source 55 to the load 64 is equal to the command transmission power ($P^*_{DD}$). Further, the phase difference φ determination processing section 504i changes the phase difference φ in light of feedback on actual transmission power ($P_{DD}$) to ensure that the actual transmission power ($P_{DD}$) is maintained equal to the command transmission power ($P^*_{DD}$).

Meanwhile, the ON time δ determination processing section 506i establishes a command voltage ($V^*_{65}$) in such a manner that the voltage corresponding to differential power obtained by subtracting, from the required power of the load 65, the transmission power ($P_{DD}$) from the power source 55 to the load 65 is supplied to the load 65 from the capacitor 80 whose output voltage is stepped up by the secondary conversion circuit 30. After that, the ON time δ determination processing section 506i determines the ON time $\delta_{FF}$ suitable for causing the secondary conversion circuit 30 to step up the output voltage of the capacitor 80 to the command voltage ($V^*_{65}$). Further, the ON time δ determination processing section 506i changes the ON time δ in light of feedback on an actual voltage ($V_{65}$) across the load 65 to ensure that the actual voltage ($V_{65}$) across the load 65 is maintained at the command voltage ($V^*_{65}$).

Based on the phase difference φ and the ON time δ determined by the phase difference φ determination processing section 504 and the ON time δ determination processing section 506, the primary switching processing section 508 and the secondary switching processing section 510 respectively control switching of the switching elements in the primary conversion circuit 20 and the secondary conversion circuit 30. Specifically, the primary switching processing section 508 controls switching of each of the switching elements in the primary left upper arm 206, the primary left lower arm 208, the primary right upper arm 210, and the primary right lower arm 212 in such a manner that the primary conversion circuit 20 is caused to function as the step up circuit and also function as a part of the DC-DC converter circuit when the operation mode E is established.

The secondary switching processing section 510 controls switching of each of the switching elements in the secondary left upper arm 306, the secondary left lower arm 308, the secondary right upper arm 310, and the secondary right lower arm 312 in such a manner that the secondary conversion circuit 30 is caused to function as a part of the DC-DC converter circuit when the operation mode E is established, or caused to function as the step-up circuit when the operation mode I is established.

When the power conversion circuit system 113 is operated with the operation modes E, I as described above, the output power of the power source 55 can be transmitted to the load 65, while it can be also achieved by supplying the load 65 with output power of the capacitor 80 to compensate for a deficiency.

Figure 17:
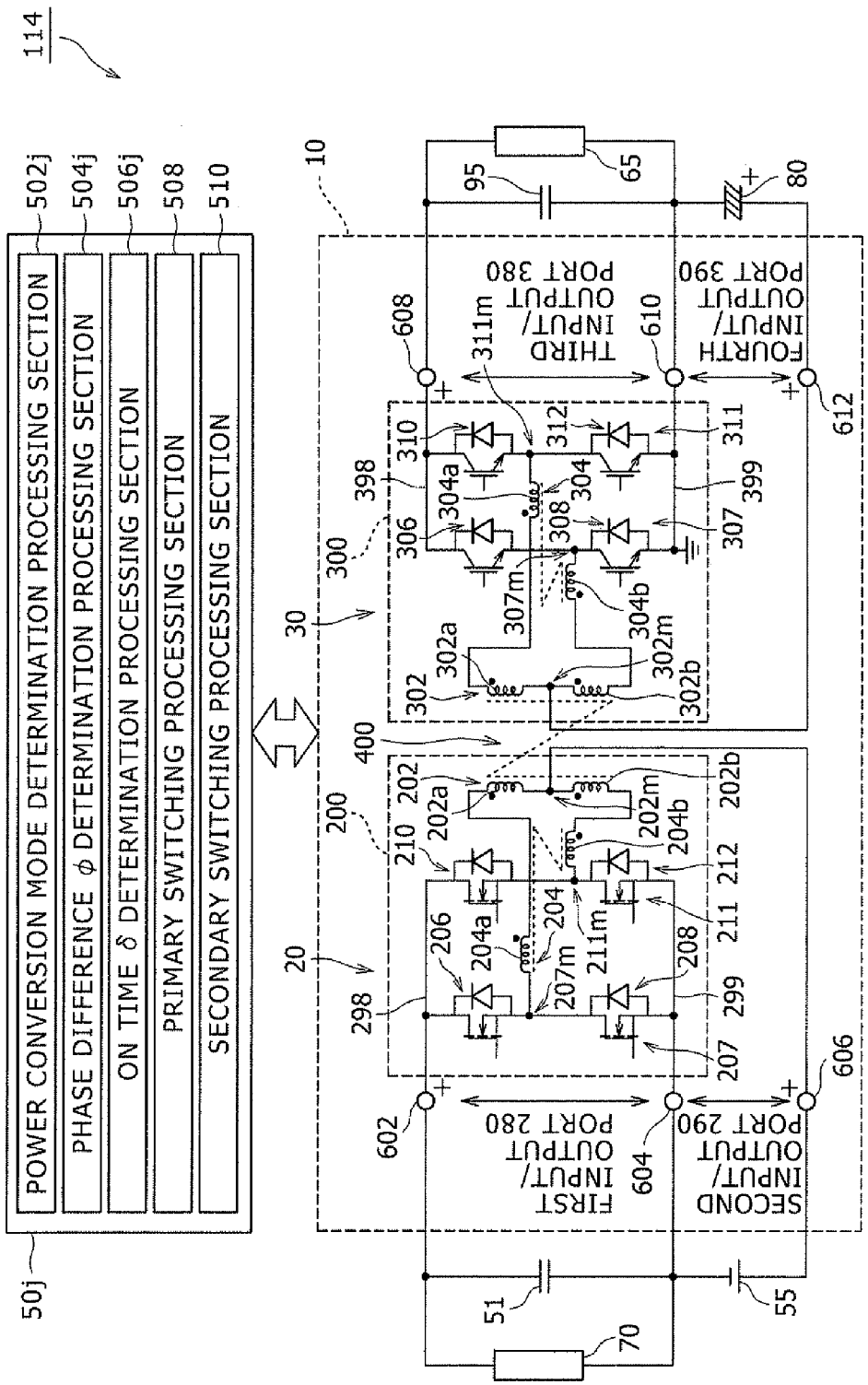
FIG. 17 shows a second modification example of the power conversion circuit system according to the seventh example in the embodiment of the present invention.
Figure 18:
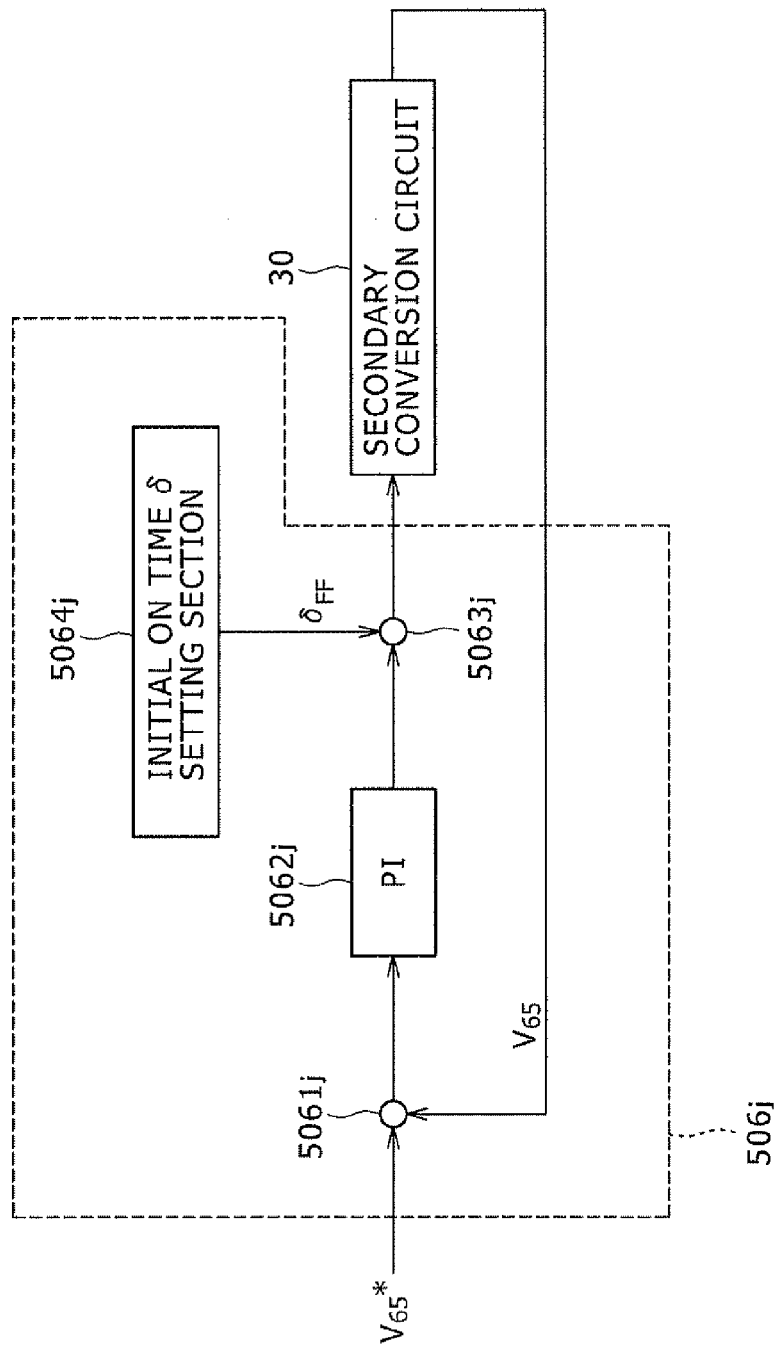
FIG. 18 is a schematic diagram showing a specific configuration of the ON time δ determination processing section in the second modification example of the power conversion circuit system according to the seventh example in the embodiment of the present invention.
Figure 19:
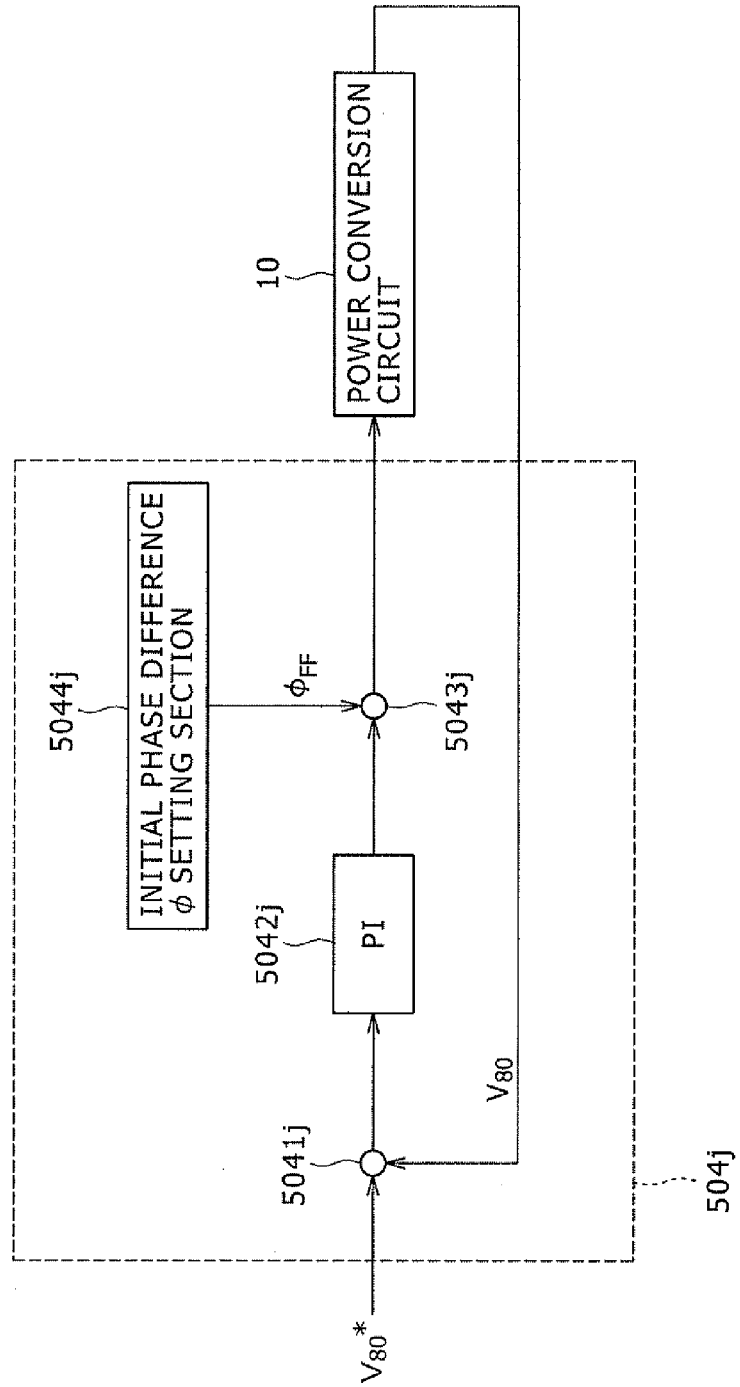
FIG. 19 is a schematic diagram showing a specific configuration of the phase difference φ determination processing section in the second modification example of the power conversion circuit system according to the seventh example in the embodiment of the present invention.

Next, a power conversion circuit system 114 which is a second modification example of the power conversion circuit system 107 will be described. FIG. 17 shows the power conversion circuit system 114. In the following description, it is assumed that changes in average output power of the capacitor 80 are compensated while instantaneous power supply to the load 65 is performed using stepped-up output power of the capacitor 80. To achieve this, the power conversion circuit system 114 should be operated with the operation modes F, I. Here, the difference between the power conversion circuit system 115 and the power conversion circuit system 107 lies in an ON δ time determination processing section 506j and a phase difference φ determination processing section 504j, which will be described below. In this example, specific configurations of the ON time δ determination processing section 506j and the phase difference φ determination processing section 504j favorable for determining the ON time δ and the phase difference φ by means of feedback control in a control circuit 50j of the power conversion system 114 are described with reference to FIGS. 18 and 19. FIG. 18 schematically shows the specific configuration of the ON time δ determination processing section 506j. FIG. 19 schematically shows the phase difference φ determination processing section 504j.

The ON time δ determination processing section 506j comprises an adding part 5061j, a PI computing part 5062j, an adding part 5063j, and an initial ON time δ setting section 5064j. The ON time δ determination processing section 506j has a function of determining an ON time δ, which will be the basis of the step-up ratio (the step up duty ratio) in the secondary conversion circuit 30, in light of feedback on the voltage ($V_{65}$) across the load 65 to ensure that the voltage across the load 65 ($V_{65}$) is set to the predetermined command voltage ($V^*_{65}$). The initial ON time δ setting section 5064j defines, as the command voltage ($V^*_{65}$), a voltage corresponding to the required power of the load 65, and previously establishes, as the initial value, an ON time $δ_{FF}$ adequate to step up the output voltage of the capacitor 80 to the command voltage ($V^*_{65}$) in the secondary conversion circuit 30. The adding part 5061j has a function of computing the command voltage ($V^*_{65}$) to be input and the voltage stepped up in the secondary conversion circuit 20 (the voltage ($V_{65}$) across the load 65) to be input through the feedback, and inputting a resulting value to the PI computing part 5062j. The PI computing part 5062j has a function of multiplying the value input from the adding part 5061j by the PI gain to obtain the reference value for ON time δ adjustment, and inputting the obtained reference value for ON time δ adjustment to the adding part 5063j. The adding part 5063j computes the previously established ON time $δ_{FF}$ and the reference value for ON time δ adjustment input from the PI computing part 5062j to obtain a new ON time δ.

The phase difference φ determination processing section 504j comprises an adding part 5041j, a PI computing part 5042j, an adding part 5043j, and an initial phase difference φ setting section 5044j. The phase difference φ determination processing section 504j has a function of determining a phase difference φ between the primary conversion circuit 20 and the secondary conversion circuit 30 in light of feedback on the voltage ($V_{80}$) across the capacitor 80 to ensure that the voltage across the capacitor 80 is maintained at a predetermined command voltage ($V^*_{80}$). The initial phase difference φ setting section 5044i defines, as the command transmission power ($P^*_{DD}$), necessary power which should be transmitted from the power source 55 to the capacitor 80 in order to maintain the voltage across the capacitor 80 at a predetermined command voltage value ($V^*_{80}$), and previously establishes a phase difference $φ_{FF}$ adequate to transmit the command transmission power ($P^*_{DD}$) from the power source 55 to the capacitor 80. The adding part 5041j has a function of computing the command voltage value ($V^*_{80}$) and the voltage ($V_{80}$) across the capacitor 80 to be input through feedback, and inputting a resulting value to the PI computing part 5042j. The PI computing part 5042j has a function of multiplying the value input from the adding part 5041j by the PI gain to obtain the reference value for phase difference φ adjustment, and inputting the obtained reference value for phase difference φ adjustment to the adding part 5043j. The adding part 5043j computes the previously established phase difference $φ_{FF}$ and the reference value for phase difference adjustment φ input from the PI computing part 5042j to obtain a new phase difference φ.

An example of operating the thus-configured power conversion circuit system 113 with the operation modes F, I will be described. Here, in the power conversion mode determination processing section 502j, the operation mode F is determined to supply electric power from the power source 55 to the capacitor 80, while the operation mode I is determined to supply electric power from the capacitor 80 to the load 65. It should be noted that which of the operation modes F and I is used for operation may be selected based on the information from the monitor or the like for monitoring the voltage of the capacitor 80, etc. Then, the ON time δ determination processing section 506j defines, as the command voltage ($V^*_{65}$), the voltage corresponding to the required power of the load 65, and determines the ON time δ adequate to step up the output power of the capacitor 80 to the command voltage ($V^*_{65}$) in the secondary conversion circuit 30. Further, the ON time δ determination processing section 506j changes the ON time δ in light of feedback on an actual voltage ($V_{85}$) across the load 65 to ensure that the actual voltage ($V_{65}$) across the load 65 is maintained at the predetermined command voltage ($V^*65$).

The phase difference 9 determination processing section 504j defines, as the command transmission power ($P^*_{DD}$), necessary power which should be transmitted from the power source 55 to the capacitor 80 in order to maintain the voltage of the capacitor 80 at the predetermined command voltage ($V^*_{80}$), and previously establishes the phase difference $φ_{FF}$ adequate to transmit the command transmission power ($P^*_{DD}$) from the power source 55 to the capacitor 80. Further, the phase difference φ determination processing section 540j changes the phase difference φ in light of an actual value of the voltage ($V_{80}$) across the capacitor 80 to ensure that the voltage ($V_{80}$) is maintained at the command voltage ($V^*_{80}$).

The primary and secondary switching processing sections 508 and 510 control the switching of each switching element in the primary and secondary conversion circuits 20 and 30 based on the phase difference $\phi$ and the ON time $\delta$ respectively determined by the phase difference $\phi$ determination processing section 504 and the ON time $\delta$ determination processing section 506. Specifically, the primary switching processing section 508 controls the switching of each switching element in the primary left upper arm 206, the primary left lower arm 208, the primary right upper arm 210, and the primary right lower arm 212 in such a manner that the primary conversion circuit 20 is caused to function as a part of the DC-DC converter circuit while the operation mode F is established.

The secondary switching processing section 510 controls the switching of each switching element in the secondary left upper arm 306, the secondary left lower arm 308, the secondary right upper arm 310, and the secondary right lower arm 312 such that the secondary conversion circuit 30 is operated to function as a part of the DC-DC converter circuit and also function as the step down circuit when the operation mode F is established, or is operated to function as the step up circuit when the operation mode I is established.

When the power conversion circuit system 114 is operated with the operation modes F, I as described above, the required power of the load 65 can be supplied from the capacitor 80 in response to a transient change in electric power, and supplied to the load 65 via the capacitor 80 from the power source 55 in response to a stationary change of in electric power.

Figure 20:
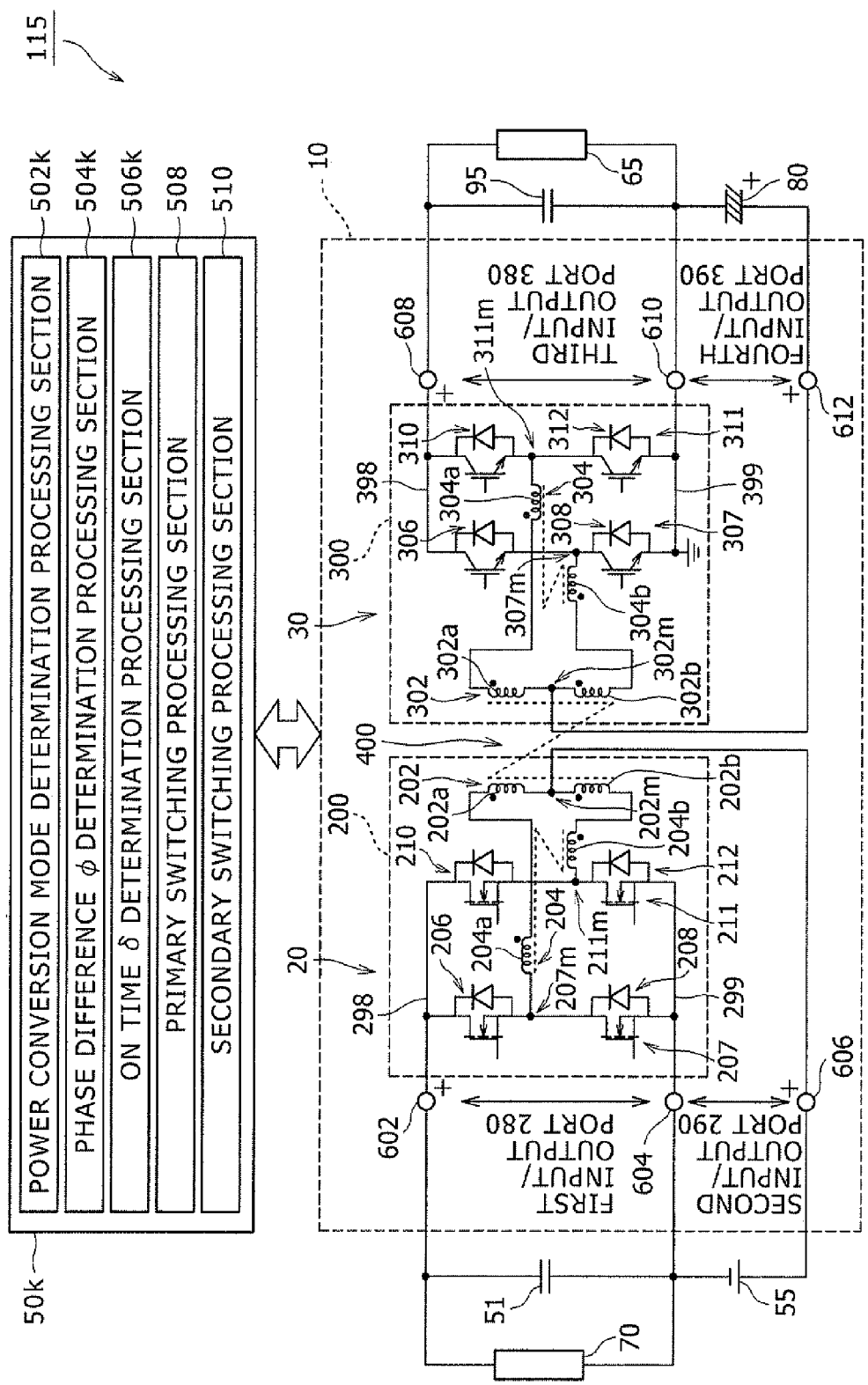
FIG. 20 shows a third modification example of the power conversion circuit system according to the seventh example in the embodiment of the present invention.
Figure 21:
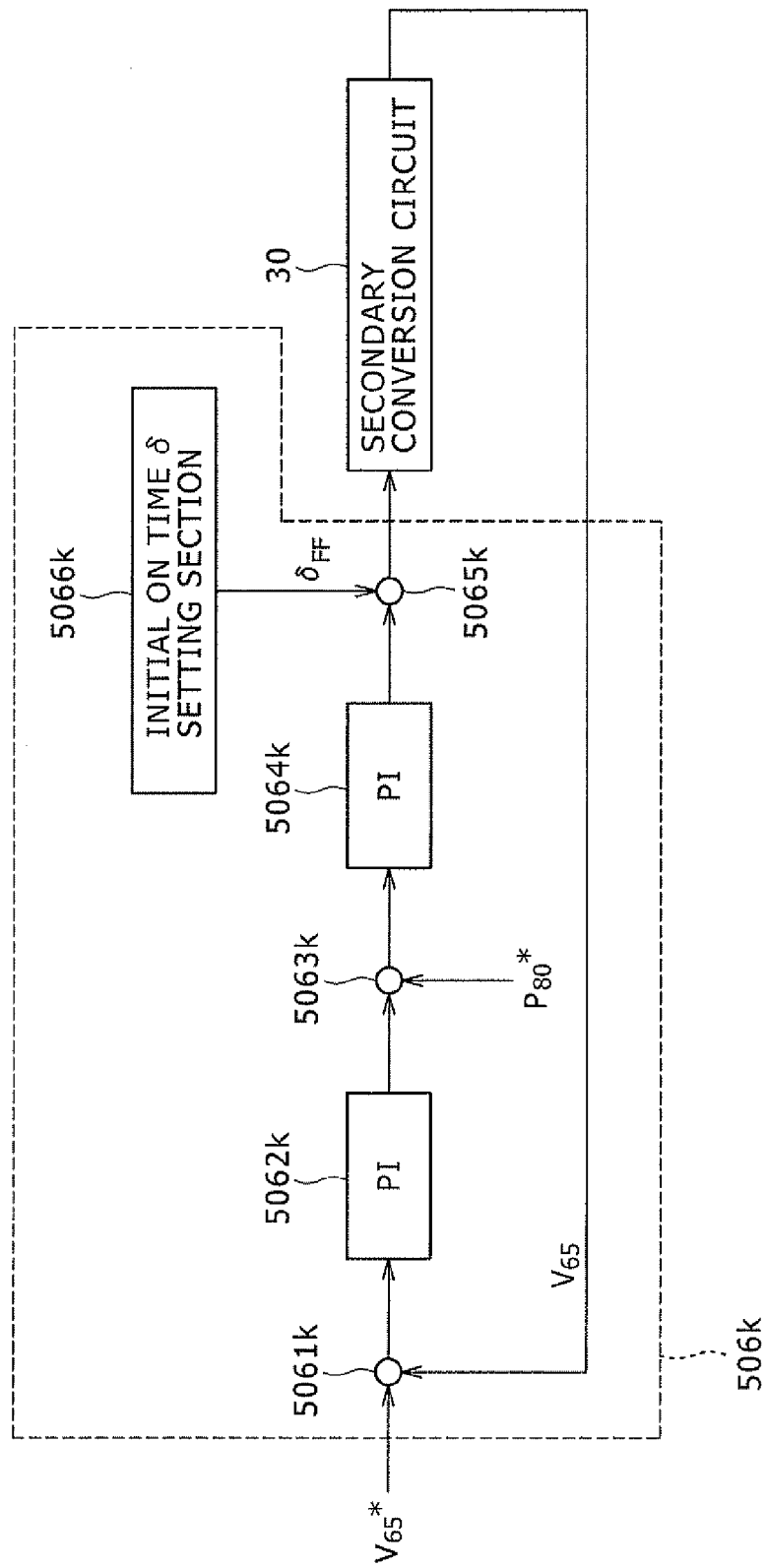
FIG. 21 is a schematic diagram showing a specific configuration of the ON time δ determination processing section in the third modification example of the power conversion circuit system according to the seventh example in the embodiment of the present invention.
Figure 22:
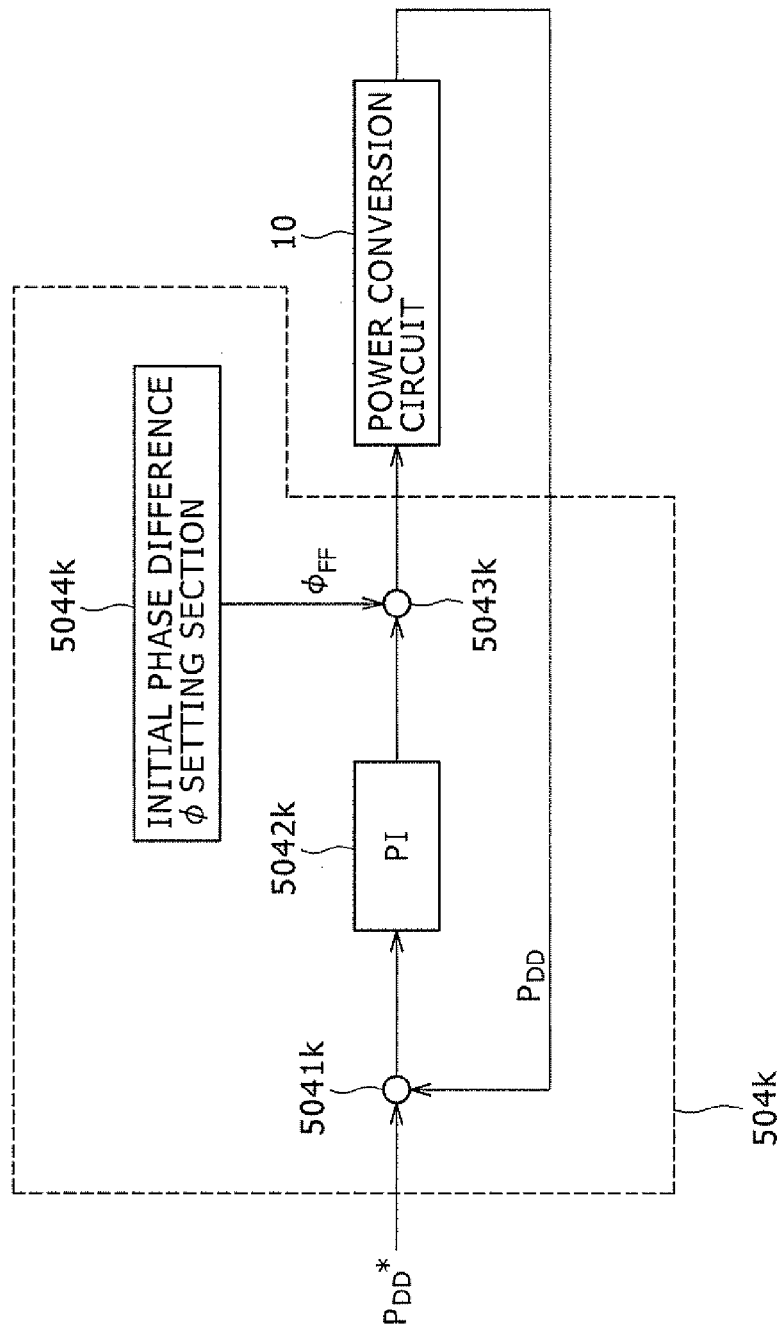
FIG. 22 is a schematic diagram showing a specific configuration of the phase difference determination processing section in the third modification example of the power conversion circuit system according to the seventh example in the embodiment of the present invention.

Next, a power conversion system 115 which is a third modification example of the power conversion system 107 will be described. FIG. 20 shows the power conversion circuit system 115. In the following description, it is assumed that electric power is transmitted from the power source 55 to the load 65, to thereby compensate for deficient electric power while output power of the capacitor 80 is stepped up to supply the stepped-up output power to the load 65. To achieve this, the power conversion circuit system 115 should be operated with the operation modes E, I. It should be noted that the difference between the power conversion circuit system 115 and the power conversion circuit system 107 lies in an ON $\delta$ time determination processing section 506k and a phase difference $\phi$ determination processing section 504k, which will be described below. In this example, specific configurations of the ON time $\delta$ determination processing section 506k and the phase difference $\phi$ determination processing section 504k favorable for determining the ON time $\delta$ and the phase difference $\phi$ by means of feedback control in a control circuit 50k of the power conversion system 115 are described with reference to FIGS. 21 and 22. FIG. 21 schematically shows the specific configuration of the ON time $\delta$ determination processing section 506k. FIG. 22 schematically shows the specific configuration of the phase difference $\phi$ determination processing section 504k.

The ON time $\delta$ determination processing section 506k comprises an adding part 5061k, a PT computing part 5062k, an adding part 5063k, a PI computing part 5064k, an adding part 5065k, and an initial ON time $\delta$ setting section 5066k. The ON time $\delta$ determination processing section 506k has a function of determining the ON time $\delta$ which will be a basis of the step up ratio (the step up duty ratio) in light of feedback on the voltage ($V_{65}$) across the load 65 to ensure that the voltage across the load 65 ($V_{65}$) is set to the predetermined command voltage ($V^*_{65}$). The initial ON time $\delta$ setting section 5066j defines, as the command voltage ($V^*_{65}$), the voltage corresponding to the required power of the load 65, and previously establishes, as the initial value, the ON time $\delta_{FF}$ adequate to step up the output voltage of the capacitor 80 to the command voltage ($V^*_{65}$) in the secondary conversion circuit 30. The adding part 5061k has a function of computing the command voltage ($V^*_{65}$) to be input and the voltage stepped up in the secondary conversion circuit 30 (the voltage ($V_{65}$) across the load 65) to be input through the feedback, and inputting a resulting value to the PI computing part 5062k. The PI computing part 5062k has a function of multiplying the value input from the adding part 5061k by the PI gain to obtain the reference value for power adjustment, and inputting the obtained reference value for power adjustment to the adding part 5063k. Then, the adding part 5063k computes the reference value for power adjustment input from the PI computing part 5062k and the command power ($P^*_{80}$), and inputs the resulting computed reference value for power adjustment to the PI computing part 5064k. The PI computing part 5064k has a function of multiplying the computed reference value for power adjustment input from the adding part 5063k by the PI gain, to obtain the reference value for ON time $\delta$ adjustment, and input the obtained reference value for ON time $\delta$ adjustment to the adding part 5065k. The adding part 5065k computes the previously established ON time $\delta_{FF}$ and the reference value for ON time $\delta$ adjustment input from the PI computing part 5064j to obtain a new ON time $\delta$.

The phase difference $\phi$ determination processing section 504k comprises an adding part 5041k, a PI computing part 5042k, an adding part 5043k, and an initial phase difference $\phi$ setting section 5044k. The phase difference $\phi$ determination processing section 504k has a function of determining a phase difference $\phi$ between the primary conversion circuit 20 and the secondary conversion circuit 30 in light of feedback on the transmission voltage ($V_{DD}$) to ensure that the command transmission power ($P^*_{DD}$) is transmitted from the power source 55 to the load 65. The initial phase difference $\phi$ setting section 5044k defines, as the command transmission power ($P^*_{DD}$) the differential power between the required power of the load 65 and the stepped-up power which is stepped up from the output power of the capacitor 80 in the secondary conversion circuit 30, and previously establishes a phase difference $\phi_{FF}$ adequate to transmit the command transmission power ($P^*_{DD}$) from the power source 55 to the load 65. The adding part 5041k has a function of computing the command transmission power ($V_{DD}$) and the transmission power ($P_{DD}$) input through feedback, and inputting a resulting value to the PI computing part 5042k. The PI computing part 5042k has a function of multiplying the value input from the adding part 5041k by the PI gain to obtain the reference value for phase difference $\phi$ adjustment, and inputting the obtained reference value for phase difference $\phi$ adjustment to the adding part 5043k. The adding part 5043k computes the previously established phase difference $\phi_{FF}$ and the reference value for phase difference $\phi$ adjustment input from the PI computing part 5042k to obtain a new phase difference $\phi$.

An example of operating the thus-configured power conversion circuit system 115 with the operation modes E, I will be described. Here, in the power conversion mode determination processing section 502k, the operation mode E is determined to supply electric power from the power source 55 to the load 65, while the operation mode is determined to supply electric power from the capacitor 80 to the load 65. It should be noted that which of the operation modes E and I is used for operation may be selected based on the information from the monitor or the like for monitoring the voltage of the capacitor 80, the load 65, etc. Then, the ON time $\delta$ determination processing section 506k defines, as the command voltage ($V^*_{65}$) the voltage corresponding to the required power of the load 65, and determines the ON time $\delta$ adequate to step up the output voltage of the capacitor 80 to the command voltage ($V^*_{65}$) in the secondary conversion circuit 30. Further, the ON time δ determination processing section 506k changes the ON time δ n light of feedback on the voltage ($V_{65}$) across the load 65 and on the predetermined command power ($P^*_{80}$) defined for the capacitor 80.

Meanwhile, the phase difference φ determination processing section 504k defines, as the command transmission power ($P^*_{DD}$) the differential power between the required power of the load 65 and the stepped-up power which is stepped up from the output power of the capacitor 80 by the secondary conversion circuit 30, and determines the phase difference φ between the primary conversion circuit 20 and the secondary conversion circuit 30 in such a manner that the transmission power ($P_{DD}$) from the power source 55 to the load 65 is set to the command transmission power ($P^*_{DD}$). Further, the phase difference φ determination processing section 504k changes the phase difference φ in light of feedback on actual transmission power ($P_{DD}$) to ensure that the actual transmission power ($P_{DD}$) is maintained equal to the command transmission power ($P^*_{DD}$).

The primary and secondary switching processing sections 508 and 510 respectively control the switching of each switching element in the primary and secondary conversion circuits 20 and 30 based on the phase difference φ and the ON time δ respectively determined by the phase difference φ determination processing section 504k and the ON time δ determination processing section 506k. Specifically, the primary switching processing section 508 controls the switching of each switching element in the primary left upper arm 206, the primary left lower arm 208, the primary right upper arm 210, and the primary right lower arm 212 in such a manner that the primary conversion circuit 20 is caused to function as a part of the DC-DC converter circuit and also function as the step up circuit when the operation mode E is established.

The secondary switching processing section 510 controls the switching of each switching element in the secondary left upper arm 306, the secondary left lower arm 308, the secondary right upper arm 310, and the secondary right lower arm 312 such that the secondary conversion circuit 30 is operated to function as a part of the DC-DC converter circuit when the operation mode E is established, or operated to function as the step-down circuit when the operation mode I is established.

When the power conversion circuit system 115 is operated with the operation mode E, I as described above, the required power of the load 65 can be supplied from the capacitor 80, while a burden of the capacitor 80 can be reduced by transmitting electric power from the power source 55 to the load 65.

What is claimed is:

1. A power conversion circuit comprising:
   a total of four input/output ports consisting of two input/output ports for a primary conversion circuit and two input/output ports for a secondary conversion circuit which is magnetically coupled with the primary conversion circuit, wherein
   electric power is converted between any two of the four input/output ports,
   the primary conversion circuit comprises:
      a first input/output port disposed between a positive bus bar and a negative bus bar of a primary full bridge circuit, and
      a second input/output port disposed between the negative bus bar of the primary full bridge circuit and a transformer; and
   the secondary conversion circuit comprises:
      a third input/output port disposed between a positive bus bar and a negative bus bar of a secondary full bridge circuit, and
      a fourth input/output port disposed between the negative bus of the secondary full bridge circuit and the transformer.

2. A power conversion circuit according to claim 1, wherein:
   the primary conversion circuit comprises
      a primary full bridge circuit including a bridge section which has both a primary coil in a center tap transformer for magnetically coupling the primary conversion circuit to the secondary conversion circuit, and a primary magnetic coupling reactor composed of two magnetically coupled reactors which are connected to respective ends of the primary coil in the transformer, and
      the second input/output port which is disposed between the negative bus bar of the primary full bridge circuit and a center tap of the primary coil in the transformer; and
   the secondary conversion circuit comprises
      a secondary full bridge circuit including a bridge section which has both a secondary coil in a center tap transformer, and a secondary magnetic coupling reactor composed of two magnetically coupled reactors which are connected to respective ends of the secondary coil in the transformer, and
      the fourth input/output port which is disposed between the negative bus bar of the secondary full bridge circuit and a center tap of the secondary coil in the transformer.

3. A power conversion circuit system comprising:
   a power conversion circuit according to claim 2;
   a load connected to any one of the input/output ports;
   a first energy storage element connected to any one of the input/output ports; and
   a second energy storage element which is connected to another one of the input/output ports different from the one to which the first energy storage element is connected, and has a characteristic different from that of the first energy storage element.

4. A power conversion circuit system according to claim 3, wherein:
   the load is connected to the input/output port which is directly supplied with stepped-up power obtained by stepping up a voltage of output power of the first energy storage element in one of the primary conversion circuit or the secondary conversion circuit, whichever is connected to the first energy storage element;
   the second energy storage element is connected to the input/output port associated with the other one of the primary conversion circuit or the secondary conversion circuit different from the one connected to the first energy storage element; and
   the power conversion circuit system includes a control unit comprising
      a transmission controlling section which performs control operation for transmitting electric power from the second energy storage element via the primary and secondary conversion circuits to the load,
      a phase difference adjusting section which adjusts a phase difference between the primary conversion circuit and the secondary conversion circuit in light of feedback on transmission power from the second energy storage element to the load to ensure that the transmission power from the second energy storage element to the load is maintained equal to predetermined electric power, a step-up controlling section which performs control operation for stepping up the output power of the first energy storage element in such a manner that the stepped-up power supplied from the first energy storage element to the load is equal to differential power between required power of the load and the transmission power from the second energy storage element to the load, and a step-up duty ratio adjusting section which adjusts a step up duty ratio used for stepping up the output power of the first energy storage element, in light of feedback on a voltage across the load to ensure that the voltage across the load is maintained at a predetermined voltage.

5. A power conversion circuit system according to claim 3, wherein:

the load is connected to the input/output port which is directly supplied with stepped-up power obtained by stepping up a voltage of output power of the first energy storage element in one of the primary conversion circuit and the secondary conversion circuit, whichever is connected to the first energy storage element;

the second energy storage element is connected to the input/output port associated with the other one of the primary conversion circuit and the secondary conversion circuit different from the one connected to the first energy storage element; and the power conversion circuit system includes a control unit comprising a step-up controlling section which performs control operation for stepping up the output power of the first energy storage element, a step-up duty ratio adjusting section which adjusts a step-up duty ratio used for stepping up the output power of the first energy storage element, in light of feedback on a voltage across the load to ensure that the voltage across the load is maintained at a predetermined voltage, a transmission controlling section which performs control operation for transmitting electric power from the second energy storage element via the primary and secondary conversion circuits to the first energy storage element, and a phase difference adjusting section which adjusts a phase difference between the primary conversion circuit and the secondary conversion circuit in light of feedback on a voltage across the first energy storage element to ensure that the voltage across the first energy storage element is maintained at a predetermined value.

6. A power conversion circuit system according to claim 3, wherein:

the load is connected to the input/output port which is directly supplied with stepped-up power obtained by stepping up a voltage of output power of the first energy storage element in one of the primary conversion circuit and the secondary conversion circuit, whichever is connected to the first energy storage element;

the second energy storage element is connected to the input/output port associated with the other one of the primary conversion circuit and the secondary conversion circuit different from the one connected to the first energy storage element; and the power conversion circuit system includes a control unit comprising a step-up controlling section which performs control operation for stepping up the output power of the first energy storage element, a step-up duty ratio adjusting section which adjusts a step-up duty ratio used for stepping up the output power of the first energy storage element, in light of feedback on a voltage across the load to ensure that the voltage across the load is maintained at a predetermined voltage, and in light of feedback on electric power of the first energy storage element to ensure that the electric power of the first energy storage element is maintained equal to predetermined power, a transmission controlling section which performs control operation for transmitting electric power from the second energy storage element to the load in such a manner that the transmission power transmitted from the second energy storage element via the primary and secondary conversion circuits to the load is equal to differential power between required power of the load and the stepped-up power supplied from the first energy storage element to the load, and a phase difference adjusting section which adjusts a phase difference between the primary conversion circuit and the secondary conversion circuit in light of feedback on transmission power from the second energy storage element to the load to ensure that the transmission power from the second energy storage element to the load is maintained equal to the differential power.

7. A power conversion circuit system according to claim 3, wherein:

a first load is disposed in parallel to the input/output port which is the same as the input/output port to which the first energy storage element is connected;

the second energy storage element is connected to the input/output port associated with one of the primary conversion circuit and the secondary conversion circuit, whichever is different from that connected to the first energy storage element;

a second load is connected to the input/output port which is directly supplied with stepped-up power obtained by stepping up output power of the second energy storage element in one of the primary conversion circuit and the secondary conversion circuit, whichever is connected to the second energy storage element; and the power conversion circuit system includes a control unit comprising a step-up controlling section which performs control operation for stepping up the output power of the second energy storage element, a step-up duty ratio adjusting section which adjusts a step-up duty ratio used for stepping up the output power of the second energy storage element, in light of feedback on a voltage across the second load to ensure that the voltage across the second load is maintained at a predetermined voltage, a transmission controlling section which performs control operation for transmitting electric power from the second energy storage element to the load in such a manner that transmission power transmitted from the second energy storage element via the primary and secondary conversion circuits to the first load is equal to predetermined power, and a phase difference adjusting section which adjusts a phase difference between the primary conversion circuit and the secondary conversion circuit, in light of feedback on the transmission power from the second energy storage element to the first load to ensure that the transmission power from the second energy storage element to the first load is maintained equal to the predetermined power.

8. A power conversion circuit system comprising:
the power conversion circuit according to claim 2; and
an alternating-current source connected to the midpoint of the primary magnetic coupling reactor or the secondary magnetic coupling reactor.

9. A power conversion circuit system comprising:
the power conversion circuit according to claim 2;
a secondary load connected to the third input/output port;
a secondary power source connected in parallel with the secondary load to the third input/output port for supplying electric power to the secondary load;
a primary capacitor connected to the first input/output port;
a primary power source connected to the second input/output port for supplying electric power to the primary capacitor; and
a control unit for performing control operation to supply auxiliary electric power from the primary power source to the secondary load when electric power supplied from the secondary power source to the secondary load is insufficient.

10. A power conversion circuit system according to claim 9, wherein:
the primary capacitor is a high-capacitance capacitor having an output characteristic superior to those of the primary and secondary power sources; and
the control unit performs control operation such that a stationary power component in required power of the secondary load is supplied from the secondary power source to the secondary load, while a sudden transient power component in the required power of the secondary load is supplied from the primary capacitor to the secondary load.

11. A power conversion circuit system comprising: the power conversion circuit according to claim 2;
a secondary load connected to the third input/output port;
a secondary power source connected in parallel with the secondary load to the third input/output port for supplying electric power to the secondary load;
a primary load connected to the first input/output port;
a primary capacitor connected in parallel with the primary load to the first input/output port;
a primary power source connected to the second input/output port for supplying electric power to the primary load; and
a control unit which performs control operation to transmit electric power between the primary conversion circuit and the secondary conversion circuit.

12. A power conversion circuit system according to claim 11, wherein:
the control unit comprises
a step-up controlling section which performs control operation to step up output power of the primary power source;
a step up duty factor adjusting section which adjusts a step-up duty ratio used for stepping up the output power of the primary power source, in light of feedback on a voltage across the primary load to ensure that the voltage across the primary load is maintained at a predetermined voltage;
a transmission controlling section which performs control operation to transmit electric power from the primary power source to the secondary power source in such a manner that transmission power transmitted from the primary power source via the primary and secondary conversion circuits to the secondary load is equal to predetermined electric power; and
a phase difference adjusting section which adjusts a phase difference between the primary conversion circuit and the secondary conversion circuit in light of feedback on the transmission power from the primary power source to the secondary load to ensure that the transmission power from the primary power source to the secondary load is maintained equal to predetermined electric power.

13. A power conversion circuit system comprising:
the power conversion circuit according to claim 2;
a secondary load connected to the third input/output port;
a secondary power source connected to the third input/output port in parallel with the secondary load for supplying electric power to the secondary load;
a secondary capacitor connected to the fourth input/output port;
a primary capacitor connected to the first input/output port;
a primary load connected to the second input/output port;
a primary power source connected to the second input/output port in parallel with the primary load for supplying electric power to the primary load; and
a control unit which performs control operation to transmit electric power between the primary conversion circuit and the secondary conversion circuit.

14. A power conversion circuit system comprising:
the power conversion circuit according to claim 2;
a secondary load connected to the third input/output port;
a secondary power source connected to the fourth input/output port for supplying electric power to the secondary load;
a primary capacitor connected to the first input/output port;
a primary power source connected to the second input/output port for supplying electric power to the primary capacitor; and
a control unit which performs control operation in such a manner that a stationary power component in required power of the secondary load is supplied from the secondary power source to the secondary load, while a sudden transient power component in the required power of the secondary load is supplied from the primary capacitor to the secondary load.

15. A power conversion circuit system comprising:
the power conversion circuit according to claim 2;
a secondary load connected to the third input/output port;
a secondary capacitor connected to the fourth input/output port;
a first primary capacitive power source connected to the first input/output port;
a second primary capacitive power source connected to the second input/output port; and
a control unit which performs control operation in such a manner that a stationary power component in required power of the secondary load is supplied from the first primary capacitive power source to the secondary load, while a sudden transient power component in the required power of the secondary load is supplied from the secondary capacitor to the secondary load.

16. A power conversion circuit system comprising:
the power conversion circuit according to claim 2;
a secondary load connected to the third input/output port;
a first secondary capacitor connected to the third input/output port in parallel with the secondary load;
a second secondary capacitor connected to the fourth input/output port;

a primary load connected to the first input/output port;

a primary capacitor connected to the first input/output port in parallel with the primary load;

a primary power source connected to the second input/output port for supplying electric power to the primary load; and a control unit which performs control operation to transmit electric power between the primary conversion circuit and the secondary conversion circuit.

17. A power conversion circuit system according to claim 16, wherein:

the control unit comprises a transmission controlling section which performs control operation to transmit electric power from the primary power source via the primary and secondary conversion circuits to the secondary load;

a phase difference adjusting section which adjusts a phase difference between the primary conversion circuit and the secondary conversion circuit in light of feedback on transmission power from the primary power source to the secondary load to ensure that the transmission power from the primary source to the secondary load is maintained equal to predetermined power;

a step-up controlling section which performs control operation to step up a voltage of output power of the second secondary capacitor in such a manner that stepped up power supplied from the second secondary capacitor to the secondary load is equal to differential power between required power of the secondary load and the transmission power from the primary power source to the secondary load; and a step up duty ratio adjusting section which adjusts a step up duty ratio used for stepping up the output power of the second secondary capacitor, in light of feedback on a voltage across the secondary load to ensure that the voltage across the secondary load is maintained at the predetermined power.

18. A power conversion circuit system according to claim 16, wherein:

the control unit comprises a step-up controlling section which performs control operation to step up output power of the second secondary capacitor;

a step-up duty ratio adjusting section which adjusts a step-up duty ratio used for stepping up the output power of the second secondary capacitor, in light of feedback on a voltage across the secondary load to ensure that the voltage across the secondary load is maintained at a predetermined voltage;

a transmission controlling section which performs control operation to transmit electric power from the primary power source via the primary and secondary conversion circuits to the second secondary capacitor; and a phase difference adjusting section which adjusts a phase difference between the primary conversion circuit and the secondary conversion circuit, in light of feedback on a voltage across the second secondary capacitor to ensure that the voltage of the second secondary capacitor is maintained at a predetermined value.

19. A power conversion circuit system according to claim 16, wherein:

the control unit comprises;

a step-up controlling section which performs control operation to step up output power of the second secondary capacitor;

a step-up duty ratio adjusting section which adjusts a step-up duty ratio used for stepping up the output power of the second secondary capacitor, in light of feedback on a voltage across the secondary load to ensure that the voltage across the secondary load is maintained at a predetermined voltage, and in light of feedback on electric power of the second secondary capacitor to ensure that the electric power of the second secondary capacitor is maintained equal to predetermined power;

a transmission controlling section which performs control operation to transmit electric power from the primary power source to the secondary load in such a manner that the transmission power transmitted from the primary power source via the primary and secondary conversion circuits to the secondary load is equal to predetermined electric power; and a phase difference adjusting section which adjusts a phase difference between the primary and secondary conversion circuits in light of feedback on the transmission power from the primary power source to the secondary load to ensure that the transmission power from the primary power source to the secondary load is maintained equal to the predetermined electric power.

* * * * *